United States Patent
Sanghavi et al.

(10) Patent No.: US 11,948,172 B2
(45) Date of Patent: Apr. 2, 2024

(54) RENDERING A DYNAMIC ENDEMIC BANNER ON STREAMING PLATFORMS USING CONTENT RECOMMENDATION SYSTEMS AND CONTENT AFFINITY MODELING

(71) Applicant: Roku, Inc., San Jose, CA (US)

(72) Inventors: Mehul Sanghavi, San Jose, CA (US); Rohit Mahto, San Jose, CA (US); Kelly Lee, Fullerton, CA (US); Madhulika Taneja, San Jose, CA (US)

(73) Assignee: Roku, Inc., San Jose, CA (US)

( * ) Notice: Subject to any disclaimer, the term of this patent is extended or adjusted under 35 U.S.C. 154(b) by 96 days.

(21) Appl. No.: 17/860,686

(22) Filed: Jul. 8, 2022

(65) Prior Publication Data

US 2024/0013259 A1 Jan. 11, 2024

(51) Int. Cl.
*G06Q 30/02* (2023.01)
*G06Q 30/0251* (2023.01)
*H04N 21/234* (2011.01)
*H04N 21/431* (2011.01)

(52) U.S. Cl.
CPC ... *G06Q 30/0269* (2013.01); *H04N 21/23424* (2013.01); *H04N 21/4316* (2013.01)

(58) Field of Classification Search
CPC ..... G06Q 30/0207–30/0277; H04N 21/23424; H04N 21/4316
See application file for complete search history.

(56) References Cited

U.S. PATENT DOCUMENTS

| | | | | |
|---|---|---|---|---|
| 7,904,922 B1* | 3/2011 | Haberman | ............. | G06Q 30/02 725/35 |
| 7,979,877 B2* | 7/2011 | Huber | ................ | G06Q 30/0275 725/35 |
| 8,521,832 B1* | 8/2013 | Whittaker | .......... | G06Q 30/0246 709/219 |
| 10,771,824 B1* | 9/2020 | Haritaoglu | ......... | H04N 21/2387 |
| 2005/0097470 A1* | 5/2005 | Dias | .................... | H04N 21/2368 715/725 |
| 2007/0038931 A1* | 2/2007 | Allaire | ............... | G06Q 30/0239 715/208 |
| 2010/0023863 A1* | 1/2010 | Cohen-Martin | ... | G06Q 30/0601 705/26.1 |
| 2010/0094703 A1* | 4/2010 | Bramley | ........... | H04M 1/72427 715/823 |

(Continued)

*Primary Examiner* — Thuy N Nguyen
(74) *Attorney, Agent, or Firm* — Sterne, Kessler, Goldstein & Fox P.L.L.C.

(57) ABSTRACT

Disclosed herein are system, apparatus, article of manufacture, method and/or computer program product embodiments, and/or combinations and sub-combinations thereof, for utilizing a content recommendation system powering a streaming media publisher channel to enhance an ad creative being shown to the user via awareness or performance campaigns. This method allows the platform to present the most relevant hyper-personalized in-channel content to the publisher platform users in endemic banners that run on the platform which then correspondingly helps drive user reach. An example embodiment operates by implementing personalized content banners that may act as a hook for channel users opening their streaming device, both active and lapsed, to enter back into the channel.

20 Claims, 10 Drawing Sheets

(56) References Cited

U.S. PATENT DOCUMENTS

| | | | |
|---|---|---|---|
| 2010/0099441 A1* | 4/2010 | Agarwal | G06Q 30/02 |
| | | | 455/566 |
| 2011/0066497 A1* | 3/2011 | Gopinath | G06Q 30/02 |
| | | | 705/14.53 |
| 2011/0289452 A1* | 11/2011 | Jordan | H04N 21/4622 |
| | | | 715/810 |
| 2014/0289047 A1* | 9/2014 | Yee | G06Q 30/0261 |
| | | | 705/14.58 |
| 2016/0247189 A1* | 8/2016 | Shirley | G06Q 30/0277 |
| 2016/0328789 A1* | 11/2016 | Grosz | G06F 3/1287 |
| 2017/0300965 A1* | 10/2017 | Arankalle | H04N 21/23424 |
| 2018/0174167 A1* | 6/2018 | Tremblay | G06N 20/00 |
| 2018/0189823 A1* | 7/2018 | Xie | G06Q 30/0276 |
| 2022/0309543 A1* | 9/2022 | Kushner | G06Q 30/0276 |
| 2023/0091238 A1* | 3/2023 | Brown | G06Q 30/0251 |
| | | | 709/231 |

\* cited by examiner

RENDERING A DYNAMIC ENDEMIC BANNER ON STREAMING PLATFORMS USING CONTENT RECOMMENDATION SYSTEMS AND CONTENT AFFINITY MODELING

BACKGROUND

Field

This disclosure is generally directed to creation of dynamic banners, and more particularly to recommendation systems providing content for personalized banners.

Background

Serving ad content that is personalized to users is not new in the display advertising ecosystem. However, personalization of endemic media on Over-the-Top (OTT) devices has been difficult for several reasons. Endemic advertising works by placing, or allowing another business to place, advertising that appeals directly to the interests of customers. A cooking magazine, for example, makes an effective advertising outlet for companies that make kitchen knives or cookware. Ad media is typically run on awareness or performance optimization basis and in both cases, the targeting selected by the ad server may not translate into an actual content experience for the user, but only a selection of the user for the campaign. The user may be chosen based off one or more targeting attributes that can include viewership data amongst hundreds of other possible signals. But all of that is used to isolate one of many eligible campaigns for the user to see. This approach does not solve the last mile problem of showing the best, most accurate content-based creative that the user is likely to take action on.

SUMMARY

Provided herein are system, apparatus, article of manufacture, method and/or computer program product embodiments, and/or combinations and sub-combinations thereof, for hyper-personalized banner generation. This approach allows an advertisement platform to present the most relevant machine learning (ML) personalized in-channel content to a publisher platform's users in customer personalized endemic banners that run on the platform, which then correspondingly helps drive user reach by creating a sentiment that the platform really understands them. For example, based on a user's profile, the user is presented with specific preferred content (i.e., hyper-personalized) within the banner that the user can immediately identify with.

An example embodiment operates by implementing personalized content banners that may act as a hook for channel users opening their streaming device, both active and lapsed, to enter back into the channel.

BRIEF DESCRIPTION OF THE FIGURES

The accompanying drawings are incorporated herein and form a part of the specification.

In the drawings, like reference numbers generally indicate identical or similar elements. Additionally, generally, the left-most digit(s) of a reference number identifies the drawing in which the reference number first appears.

DETAILED DESCRIPTION

Provided herein are system, apparatus, article of manufacture, method and/or computer program product embodiments, and/or combinations and sub-combinations thereof, for utilizing a content recommendation system powering a publisher channel to enhance an effectiveness of an ad creative being shown to the user via awareness or performance campaigns. In some embodiments, a hyper-personalized banner is generated with specific preferred content that the user can immediately identify with. In some embodiments, content selection and dynamic placement markup is optimized for each specific user.

Figure 1:
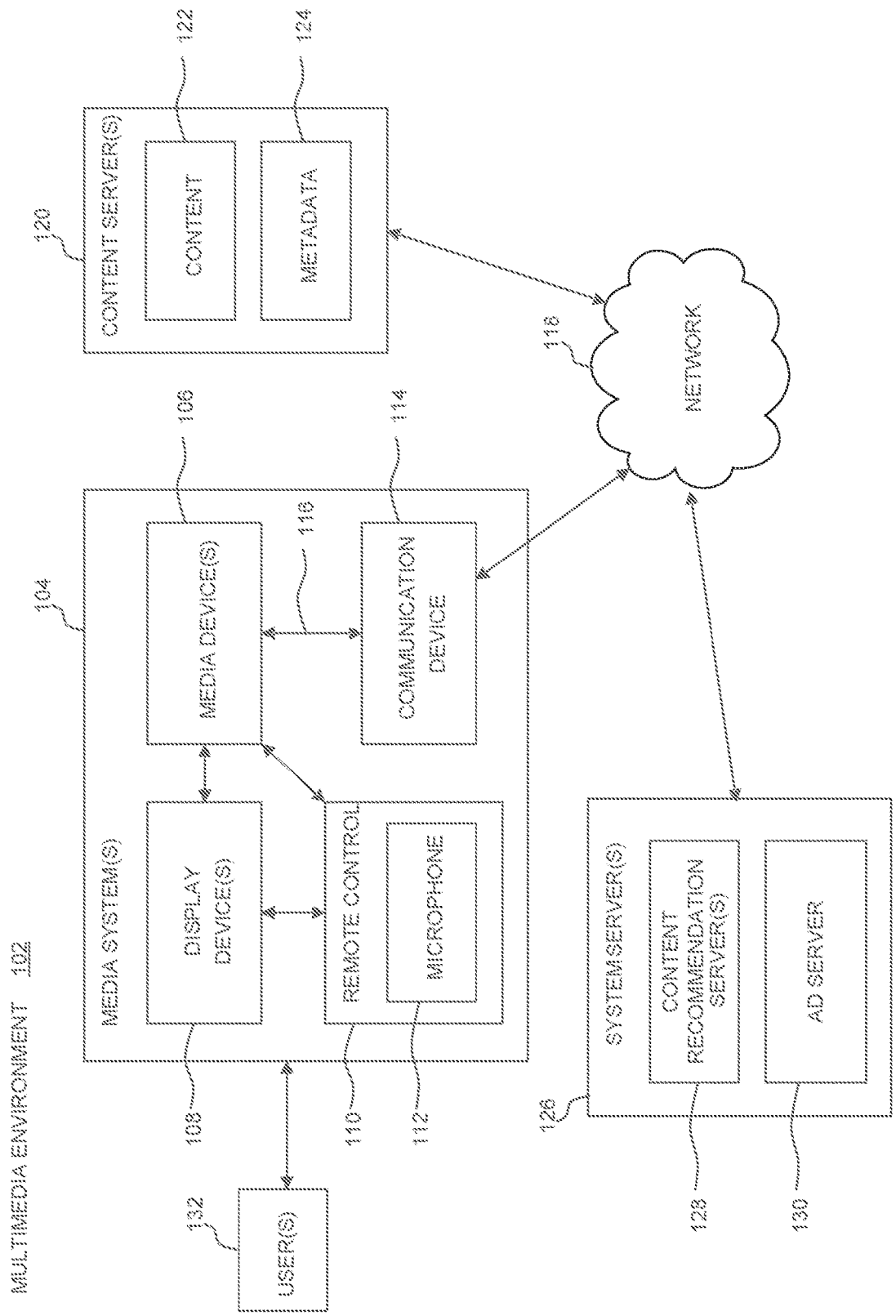
FIG. 1 illustrates a block diagram of a multimedia environment, according to some embodiments.

Various embodiments of this disclosure may be implemented using and/or may be part of a multimedia environment 102 shown in FIG. 1. It is noted, however, that multimedia environment 102 is provided solely for illustrative purposes, and is not limiting. Embodiments of this disclosure may be implemented using and/or may be part of environments different from and/or in addition to the multimedia environment 102, as will be appreciated by persons skilled in the relevant art(s) based on the teachings contained herein. An example of the multimedia environment 102 shall now be described.

The terms "user" and "customer" may be interchangeably used throughout the descriptions that follow.

Multimedia Environment

FIG. 1 illustrates a block diagram of a multimedia environment 102, according to some embodiments. In a non-limiting example, multimedia environment 102 may be directed to streaming media. However, this disclosure is applicable to any type of media (instead of or in addition to streaming media), as well as any mechanism, means, protocol, method and/or process for distributing media.

The multimedia environment 102 may include one or more media systems 104. A media system 104 could represent a family room, a kitchen, a backyard, a home theater, a school classroom, a library, a car, a boat, a bus, a plane, a movie theater, a stadium, an auditorium, a park, a bar, a restaurant, or any other location or space where it is desired to receive and play streaming content. User(s) 132 may operate with the media system 104 to select and consume content.

Each media system 104 may include one or more media devices 106 each coupled to one or more display devices 108. It is noted that terms such as "coupled," "connected to," "attached," "linked," "combined" and similar terms may refer to physical, electrical, magnetic, logical, etc., connections, unless otherwise specified herein.

Media device 106 may be a streaming media device, DVD or BLU-RAY device, audio/video playback device, cable box, and/or digital video recording device, to name just a few examples. Display device 108 may be a monitor, television (TV), computer, smart phone, tablet, wearable (such as a watch or glasses), appliance, internet of things (IoT) device, and/or projector, to name just a few examples. In some embodiments, media device 106 can be a part of, integrated with, operatively coupled to, and/or connected to its respective display device 108.

Each media device 106 may be configured to communicate with network 118 via a communication device 114. The communication device 114 may include, for example, a cable modem or satellite TV transceiver. The media device 106 may communicate with the communication device 114 over a link 116, wherein the link 116 may include wireless (such as WiFi) and/or wired connections.

In various embodiments, the network 118 can include, without limitation, wired and/or wireless intranet, extranet, Internet, cellular, Bluetooth, infrared, and/or any other short range, long range, local, regional, global communications mechanism, means, approach, protocol and/or network, as well as any combination(s) thereof.

Media system 104 may include a remote control 110. The remote control 110 can be any component, part, apparatus and/or method for controlling the media device 106 and/or display device 108, such as a remote control, a tablet, laptop computer, smartphone, wearable, on-screen controls, integrated control buttons, audio controls, or any combination thereof, to name just a few examples. In an embodiment, the remote control 110 wirelessly communicates with the media device 106 and/or display device 108 using cellular, Bluetooth, infrared, etc., or any combination thereof. The remote control 110 may include a microphone 112, which is further described below.

The multimedia environment 102 may include a plurality of content servers 120 (also called content providers or sources). Although only one content server 120 is shown in FIG. 1, in practice the multimedia environment 102 may include any number of content servers 120. Each content server 120 may be configured to communicate with network 118.

Each content server 120 may store content 122 and metadata 124. Content 122 may include any combination of music, videos, movies, TV programs, multimedia, images, still pictures, text, graphics, gaming applications, advertisements, programming content, public service content, government content, local community content, software, and/or any other content or data objects in electronic form.

In some embodiments, metadata 124 comprises data about content 122. For example, metadata 124 may include associated or ancillary information indicating or related to writer, director, producer, composer, artist, actor, character, geographic location, summary, chapters, production, history, year, trailers, alternate versions, related content, applications, and/or any other information pertaining or relating to the content 122. Metadata 124 may also or alternatively include links to any such information pertaining or relating to the content 122. Metadata 124 may also or alternatively include one or more indexes of content 122, such as but not limited to a trick mode index.

The multimedia environment 102 may include one or more system servers 126. The system servers 126 may operate to support the media devices 106 from the cloud. It is noted that the structural and functional aspects of the system servers 126 may wholly or partially exist in the same or different ones of the system servers 126.

The media devices 106 may exist in thousands or millions of media systems 104. Accordingly, the media devices 106 may lend themselves to advertising embodiments and, thus, the system servers 126 may include one or more advertising servers 130. In some embodiments, the media device 106 may display advertisements in the media system 104, such as on the display device 108.

In addition, using information received from the media devices 106 in the thousands and millions of media systems 104, content recommendation server(s) 128 may identify viewing habits, for example, preferences or likes for different users 132 watching a particular movie. Based on such information, the content recommendation server(s) 128 may determine that users with similar watching habits may be interested in watching similar content.

The system servers 126 may also include an audio server (not shown). In some embodiments, the audio data received by the microphone 112 in the remote control 110 is transferred to the media device 106, which is then forwarded to the system servers 126 to process and analyze the received audio data to recognize the user 132's verbal command. The system servers 126 may then forward the verbal command back to the media device 106 for processing.

Figure 2:
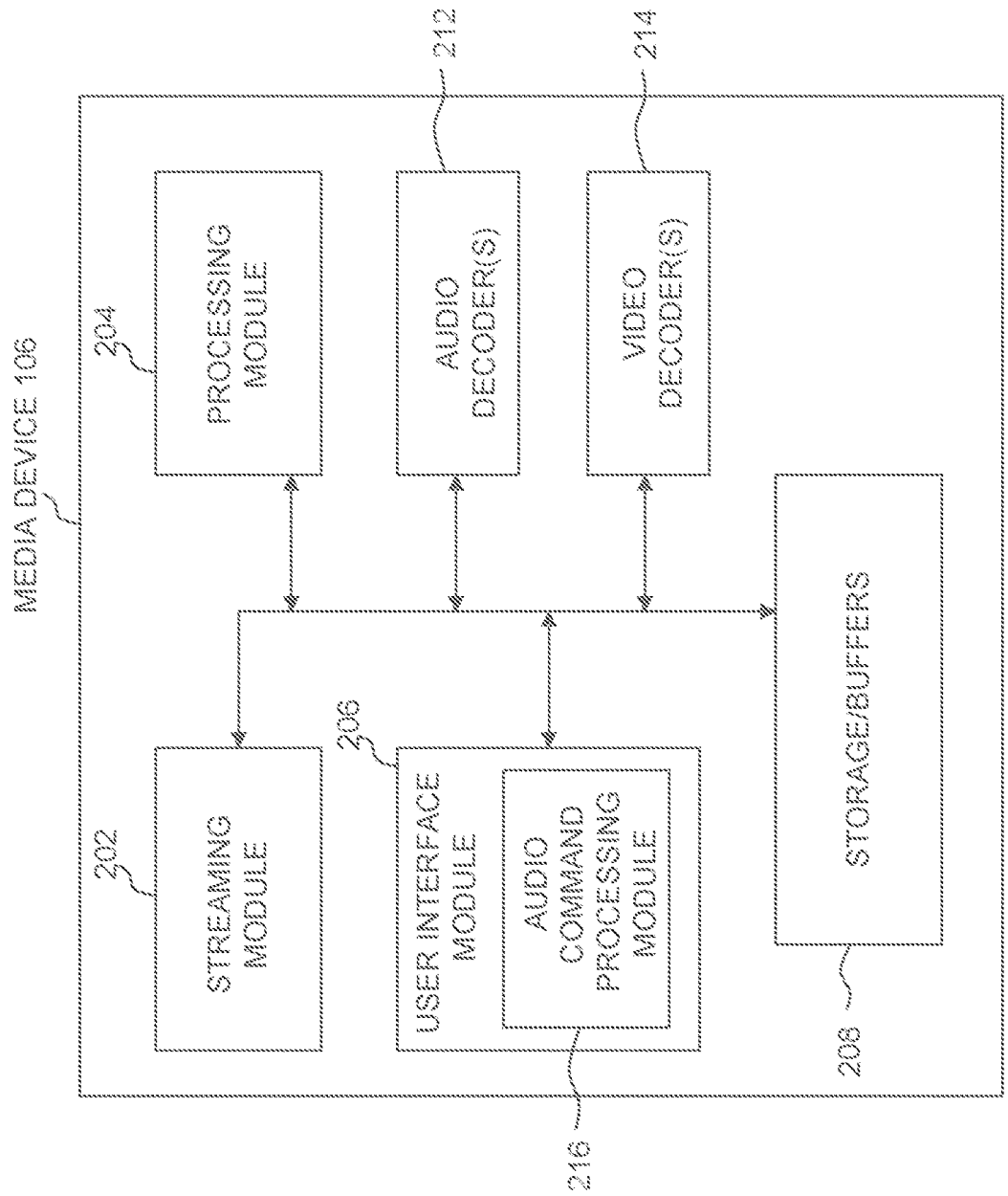
FIG. 2 illustrates a block diagram of a streaming media device, according to some embodiments.

In some embodiments, the audio data may be alternatively or additionally processed and analyzed by an audio command processing module 216 in the media device 106 (see FIG. 2). The media device 106 and the system servers 126 may then cooperate to pick one of the verbal commands to process in the system servers 126, or the verbal command recognized by the audio command processing module 216 in the media device 106).

FIG. 2 illustrates a block diagram of an example media device 106, according to some embodiments. Media device 106 may include a streaming module 202, processing module 204, storage/buffers 208, and user interface module 206. As described above, the user interface module 206 may include the audio command processing module 216.

The media device 108 may also include one or more audio decoders 212 and one or more video decoders 214.

Each audio decoder 212 may be configured to decode audio of one or more audio formats, such as but not limited to AAC, HE-AAC, AC3 (Dolby Digital), EAC3 (Dolby Digital Plus), WMA, WAV, PCM, MP3, OGG GSM, FLAC, AU, AIFF, and/or VOX, to name just some examples.

Similarly, each video decoder 214 may be configured to decode video of one or more video formats, such as but not limited to MP4 (mp4, m4a, m4v, f4v, f4a, m4b, m4r, f4b, mov), 3GP (3gp, 3gp2, 3g2, 3gpp, 3gpp2), OGG (ogg, oga, ogv, ogx), WMV (wmv, wma, asf), WEBM, FLV, AVI, QuickTime, HDV, MXF (OP1a, OP-Atom), MPEG-TS, MPEG-2 PS, MPEG-2 TS, WAV, Broadcast WAV, LXF, GXF, and/or VOB, to name just some examples. Each video decoder 214 may include one or more video codecs, such as but not limited to H.263, H.264, HEV, MPEG1, MPEG2, MPEG-TS, MPEG-4, Theora, 3GP, DV, DVCPRO, DVCPRO, DVCProHD, IMX, XDCAM HD, XDCAM HD422, and/or XDCAM EX, to name just some examples.

Now referring to both FIGS. 1 and 2, in some embodiments, the user 132 may interact with the media device 106 via, for example, the remote control 110. For example, the user 132 may use the remote control 110 to interact with the user interface module 206 of the media device 106 to select content, such as a movie, TV show, music, book, application, game, etc. The streaming module 202 of the media device 106 may request the selected content from the content server(s) 120 over the network 118. The content server(s) 120 may transmit the requested content to the streaming module 202. The media device 106 may transmit the received content to the display device 108 for playback to the user 132.

In streaming embodiments, the streaming module 202 may transmit the content to the display device 108 in real time or near real time as it receives such content from the content server(s) 120. In non-streaming embodiments, the media device 106 may store the content received from content server(s) 120 in storage/buffers 208 for later playback on display device 108.

Personalized Banners Based on Content Recommendation Services and Content Affinity Modeling Referring to FIG. 1, the media devices 106 may exist in thousands or millions of media systems 104. Accordingly, the media devices 106 may lend themselves to ad content solution embodiments. In some embodiments, an over-the-top (OTT) media device or service may benefit from the embodiments disclosed herein. An over-the-top (OTT) media service is a media service offered directly to viewers via the Internet. OTT bypasses cable, broadcast, and satellite television platforms; the types of companies that traditionally act as controllers or distributors of such content. The term is most synonymous with subscription-based video-on-demand (SVoD) services that offer access to film and television content (including existing series acquired from other producers, as well as original content produced specifically for the service).

OTT also encompasses a wave of "skinny" television services that offer access to live streams of linear specialty channels, similar to a traditional satellite or cable TV provider, but streamed over the public Internet, rather than a closed, private network with proprietary equipment such as set-top boxes. Over-the-top services are typically accessed via websites on personal computers, as well as via apps on mobile devices (such as smartphones and tablets), digital media players (including video game consoles), or televisions with integrated Smart TV platforms.

In various embodiments, the technology described herein implements a system, apparatus, article of manufacture, method and/or computer program product embodiments, and/or combinations and sub-combinations thereof, for utilizing a content recommendation system (RecSys) powering a publisher channel to enhance an ad creative being shown to the user via awareness or performance campaigns. This method allows the platform to present the most relevant ML personalized in-channel content to the publisher platform users in endemic banners that run on the platform which then correspondingly helps drive user reach.

A content recommender system, or a content recommendation system, is a subclass of information filtering system that seeks to predict the "rating" or "preference" a user would give to an item. The embodiments described herein may use any content recommendation system, algorithm or models without departing from the scope of the technology described herein. A few commonly used systems will be described hereafter, but other approaches, including future approaches may be interchanged herein without departing from the scope of the technology described.

Content recommendation systems are used in a variety of areas, with commonly recognized examples taking the form of playlist generators for movies, series, documentaries, podcasts, music services, and product recommendations, to name a few. In some embodiments, the playlist may be instantiated as a series of visual tiles displaying a sample image of the content or selectable movie trailer. The tiles may be arranged by some selected ordering system (e.g., popularity) and may be arranged in groups or categories, such as "trending", "top 10", "newly added", "sports", "action", etc.

One approach to the design of recommender systems that has wide use is collaborative filtering. Collaborative filtering is based on the assumption that people who agreed in the past will agree in the future, and that they will like similar kinds of items as they liked in the past. The system generates recommendations using only information about rating profiles for different users or items. By locating peer users/items with a rating history similar to the current user or item, they generate recommendations using this neighborhood. Collaborative filtering methods are classified as memory-based and model-based. A well-known example of memory-based approaches is the user-based algorithm, while that of model-based approaches is the Kernel-Mapping Recommender.

A key advantage of the collaborative filtering approach is that it does not rely on machine analyzable content and therefore it is capable of accurately recommending complex items such as movies without requiring an "understanding" of the item itself. Many algorithms have been used in measuring user similarity or item similarity in recommender systems. When building a model from a user's behavior, a distinction is often made between explicit and implicit forms of data collection. An example of explicit data collection may include asking a user to rate an item. While examples of implicit data collection may include observing the items that a user views, analyzing item/user viewing times, keeping a record of content items that a user purchases, or building a list of items that a user has watched on one or more streaming platforms.

Another common approach when designing recommender systems is content-based filtering. Content-based filtering methods are based on a description of the item and a profile of the user's preferences. These methods are best suited to situations where there is known data on an item (name, location, description, etc.), but not on the user. Content-based recommenders treat recommendation as a user-specific classification problem and learn a classifier for the user's likes and dislikes based on an item's features.

In this system, keywords are used to describe the items, and a user profile is built to indicate the type of item this user likes. In other words, these algorithms try to recommend items similar to those that a user liked in the past or is examining in the present. It does not rely on a user sign-in mechanism to generate this often temporary profile. In particular, various candidate items are compared with items previously rated by the user, and the best-matching items are recommended.

Basically, these various methods use an item profile (i.e., a set of discrete attributes and features) characterizing the item within the system. To abstract the features of the items in the system, an item presentation algorithm is applied. A widely used algorithm is the tf-idf representation (also called vector space representation). The system creates a content-based profile of users based on a weighted vector of item features. The weights denote the importance of each feature to the user and can be computed from individually rated content vectors using a variety of techniques. Simple approaches use the average values of the rated item vector while other sophisticated methods use machine learning techniques such as Bayesian Classifiers, cluster analysis, decision trees, and artificial neural networks in order to estimate the probability that the user is going to like the item.

Content-based recommender systems can also include opinion-based recommender systems. In some cases, users are allowed to leave movie reviews or feedback on the items. Features extracted from the user-generated reviews may improve meta-data of content items. Sentiments extracted from the reviews can be seen as users' rating scores on the corresponding features. Common approaches of opinion-based recommender systems utilize various techniques including machine learning, sentiment analysis and deep learning.

Figure 3:
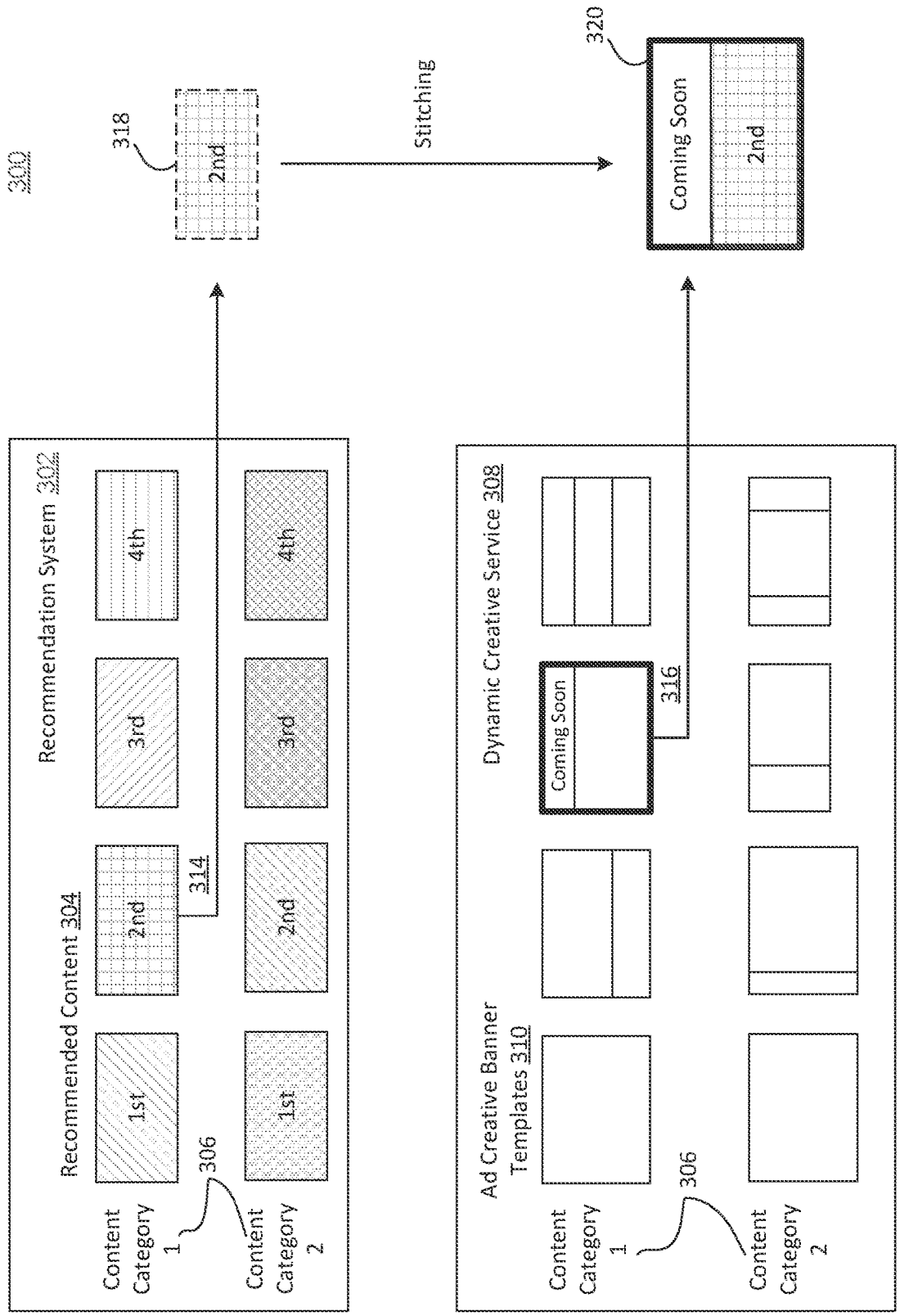
FIG. 3 illustrates an example diagram of a personalized banner system, according to some embodiments.

FIG. 3 illustrates a non-limiting example of a dynamically created personalized ad banner for an OTT system. FIGS. 4-7 illustrate non-limiting examples of dynamically created hyper-personalized banners for an OTT system. These examples should not limit the scope of the technology described herein as they are limited to high level illustrations of one or more parts of the overall system and processes. While illustrated as separate functional blocks in these figures, one or more of these blocks may be operational in various parts of the system. For example, one or more components described for generating hyper-personalized ad banners may be performed in the content recommendation servers 128, the ad server 130, the content servers 120, the media system 104, other cloud based systems or any combination thereof.

FIG. 3 illustrates an example diagram of a personalized banner system 300, according to some embodiments. Operations described may be implemented by processing logic that can comprise hardware (e.g., circuitry, dedicated logic, programmable logic, microcode, etc.), software (e.g., instructions executing on a processing device), or a combination thereof. It is to be appreciated that not all operations may be needed to perform the disclosure provided herein. Further, some of the operations may be performed simultaneously, or in a different order than described for FIG. 3, as will be understood by a person of ordinary skill in the art.

Personalized banner system 300 may be implemented with a recommendation system 302. Recommendation system 302 may be configured with content recommendation server 128. Alternatively, or in addition to, one or more components of the recommendation system 302 may be implemented within the media system 104, by third party platforms, a cloud-based system or distributed across multiple computer-based systems. As shown, personalized banner system 300 may be implemented with a dynamic creative service 308.

In some embodiments, dynamic creative service 308 may be configured with ad server 130. Alternatively, or in addition to, one or more components of the dynamic creative service 308 may be implemented within the media system 104, by third party platforms, a cloud-based system or distributed across multiple computer-based systems. As shown, dynamic creative service 308 may be configured with a plurality of possible advertising banner samples. Advertising banner samples may be templates 310 directed to specific advertising strategies and include differing sizes, colors, fonts, messaging, backgrounds and locations to add recommendation specific content. For example, based on meeting specific Key Productivity Indicators (KPIs), an art, design, marketing or advertising department within a company may create creative work such as advertising art work that will produce an expected user action responsive to the specific ad banner. For example, to grow an audience for a new series, the creative team may generate a banner ad with the hook "hot new series".

Building on the above "new series" example, in an exemplary embodiment, the recommendation system would generate a content category 1 of a plurality of content categories 306 of recommended content 304 of new shows and order them (shown as tiles 1-4, etc.) based on viewership, expected viewership, desired viewership, to name a few. The personalized banner system 300 would then identify related advertising campaigns as well as identifying related content that would complement or improve these campaigns. As shown, a creative ad banner template 316 is selected from the same content category (1) to introduce a new series that is coming soon to the streaming service or platform. Content 314 that is recommended in a matching category would be selected 318, resized (as needed) and stitched into the ad banner template 316. The composite banner 320 result marries the benefits of a crafted ad campaign to the intelligence of the recommendation system 302 and provides a technical improvement to the banner creation process.

Figure 4:
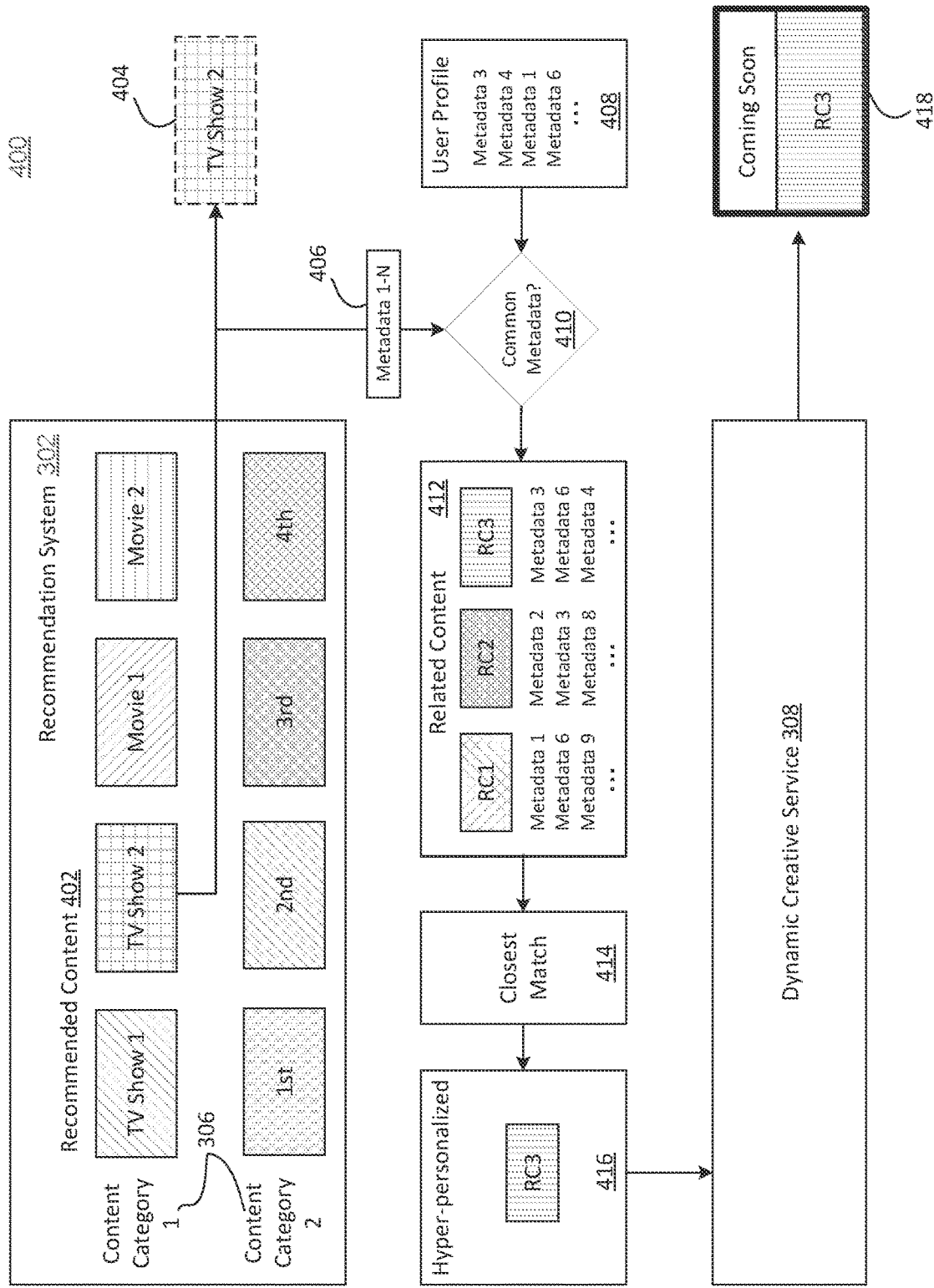
FIG. 4 illustrates an example diagram of a hyper-personalized banner system, according to some embodiments.

FIG. 4 illustrates an example diagram of a hyper-personalized banner system 400, according to some embodiments. Operations described may be implemented by processing logic that can comprise hardware (e.g., circuitry, dedicated logic, programmable logic, microcode, etc.), software (e.g., instructions executing on a processing device), or a combination thereof. It is to be appreciated that not all operations may be needed to perform the disclosure provided herein. Further, some of the operations may be performed simultaneously, or in a different order than described for FIG. 4, as will be understood by a person of ordinary skill in the art.

Hyper-personalized banner system 400 may be implemented with recommendation system 302. Recommendation system 302 may be configured with content recommendation server 128 to recommend one or more content assets 402 from one or more categories 306. Alternatively, or in addition to, one or more components of the recommendation system 302 may be implemented within the media system 104, by third party platforms, a cloud-based system or distributed across multiple computer-based systems. As shown, hyper-personalized banner system 400 may be implemented with a dynamic creative service 308.

In some embodiments, dynamic creative service 308 may be configured with ad server 130. Alternatively, or in addition to, one or more components of the dynamic creative service 308 may be implemented within the media system 104, by third party platforms, a cloud-based system or distributed across multiple computer-based systems. Dynamic creative service 308 may be configured with a plurality of possible advertising banner samples (i.e., templates) or may be configured as a dynamic banner generator (customized content, sizing, colors, graphics, arrangement, etc.). For example, the dynamic banner generator may position artwork elements differently from a standard template arrangement.

In a hyper-personalized embodiment, additional customer specific related content 412 is selected beyond the originally recommended content asset 404, as shown, "TV Show 2". This hyper-personalized content may be arranged in an advertising banner based on one or more user preferences found in the user's profile 408. In a non-limiting example, to grow an audience, the creative team may generate a banner ad template with the hook "coming soon" or similar phrasing that suggests the content will soon to be available. The user profile is a preferences file, a single object containing all of the diverse information known about the user.

In a hyper-personalized embodiment, for the same recommended content (404) and ad template (e.g., FIG. 3, template 316), the system may generate one of many different banner combinations. In one non-limiting example, the recommended content 404 may include identifying metadata 1-N (406) associated therewith. For example, the recommended content 404 is "TV show 2", where the TV Show 2 content may also include associated metadata. This metadata may provide further access to related content assets directly or indirectly as they relate to the primary content asset as will be described in greater detail hereafter.

In a non-limiting example, the metadata may designate similar interests of the target consumer with other known consumer interests, such as, but not limited to, genre, actors, characters, types of characters (e.g., protagonist, hero, villain, etc.), story lines (e.g., redemption, tragedy, etc.), location of story line (e.g., city, state, country, water-based, space-based, agricultural, urban, etc.), point of view (e.g., first person, etc.), scene descriptions, when the content was made, ideology (social, political, religious, etc.), collaborations (e.g., actors, directors, media companies, etc.), or typical customer interactions (e.g., duration of watching, completion rates, etc.), to name a few.

Current system architecture will assume that there may be a plurality of primary assets for "TV Show 2", and a plurality of interrelated secondary assets, linked by metadata (i.e., direct link) or similar metadata (i.e., indirect link) in common with the user's profile 408, that can be retrieved from the Recommendation System 302 backend or an alternative content source. In this approach, a user's profile 408 will be compared for one or more metadata entries that are in common (shown as common metadata 410) to see if the customer has an affinity towards one or more of the common metadata to select an additional content asset, such as related content 412. In various embodiments, content asset metadata may be matched to user profile metadata before or after delivery of one or more recommended content assets and one or more related content assets without departing from the scope of the technology described herein.

While not shown, a link to the related content asset may also be part of the primary content asset set of metadata. Using these links, a related content asset 412 pool will be instantiated as a group of possible choices for selection of related content that the customer would find specific to their preferences.

User profile 408 metadata may be directly related to the user, for example, as demographic data (e.g., generation group, location, etc.) or declared preferences. Alternatively, or in addition to, the metadata may be collected by recommendation system 302 by observation of user behaviors (content selected, content rejected, frequency of specific actors in selected content, frequency of specific characters in selected content, character types commonly found in selected content, etc.). Content affinity may be characterized by an ordered list of metadata, with a highly occurring or user liked metadata aspect at the top of the ordered list and the next highest occurring or next liked metadata aspect following in the listing order and so on. Alternatively, or in addition to, the metadata may be arranged in ordered metadata groups, such as, but not limited to, characters, actors, genres, new shows, old shows, location specific (set in Los Angeles), decades, popularity, to name a few. Metadata is not limited to positive preferences, as negative response metadata may also be valuable to avoid content that the specific customer does not want to see (e.g., violent, specific content ratings, specific characters or actors, etc.). Other arrangements of user preferences delineated by associated metadata would be understood by one skilled in the art and may be interchanged without departing from the scope of the technology described herein.

The additional, but distinctly separate embodiments can create virtually thousands, if not millions of banner artwork combinations, providing a level of personalization never before seen on any platform, let alone OTT platforms. This hyper-personalization improves the current computer-based process of banner selection and solves one or more known problems with connecting with target customers at a level of personalization not reached by current systems.

As shown, recommendation system 302 would generate a content category 1 (306) of TV shows and movies that will be appearing soon on, for example, soon to be available on a streaming platform and order them (shown as 4 tiles) based, for example, on ratings or similar user preferences. The hyper-personalized banner system 400 would then identify related advertising campaigns as well as identifying related content 412 that would complement or improve these campaigns. "TV Show 2" 404 has associated with it one or more metadata data fields, Metadata 1-N 406, which are compared for common metadata 410 to those located in the user's profile 408. Common metadata would be a strong indicator of a user's affinity to this metadata instance (e.g., a specific actor). Alternatively, or in addition to, the comparison could be made for similar metadata to those found in the primary content asset. This approach may be effective when no common metadata are detected. For example, if a specific customer likes Actor A, identified by Metadata 1, the system could search for additional actors that commonly appear with Actor A and substitute the corresponding metadata as common metadata. Another aspect may be substituting popularity or trending factors as similar metadata. For example, Actor A is in the primary content metadata selected by the RecSys 302, but this actor is not explicitly preferred by the user in their user profile, however, as they are very popular or are trending, their metadata is substituted as matching metadata.

Related content 412 may be pushed with the original recommended content assets or be requested as a second call to the recommendation system. Alternatively, or in addition to, the call for related content may be made to a content source (e.g., content creator or content provider), such as to content server 120 (FIG. 1). As shown in the example, related content "RC1-RC3" may each include one or more additional metadata, in addition to any potentially common metadata. A matching function may be used to select from a plurality of possible related content 412 assets. For example, as shown, "RC3" matches three metadata 3, 6 and 4 found in the user profile 408 as preferences. A closest match selector 414 may determine a closest match using simple ordering, where a user's first metadata choice is selected when available in a related content asset. When multiple metadata matches are available, the system may select a related content asset by a second, third, or other number of common metadata (e.g., frequency of common metadata). Alternatively, or in addition to, a closest match selector 414 algorithm may include a weighted formulation (variable weighting) where some metadata are better indicators of a user's likes/dislikes and therefore may be more heavily weighted. For example, metadata reflecting genre may be weighted more heavily. As shown, hyper-personalized related content 416 "RC3" has been selected based on a match to the user's profile of metadata 3, 6 and 4. Other known similarity algorithms, such as, but not limited to, ML, fuzzy logic, neural networks, etc., may be substituted without departing from the scope of the technology disclosed herein.

Dynamic creative service 308 may use any template or dynamic banner generation technique to insert (e.g., stitch)

the hyper-personalized content asset 416 into an advertising banner. As shown, a creative advertising banner or dynamic banner is selected to introduce an upcoming TV show to soon be available on a streaming service or platform. Hyper-personalized content 416 "RC3", related to original recommended content asset 404, is sized and stitched into the ad banner template to form a composite ad banner 418.

Figure 5:
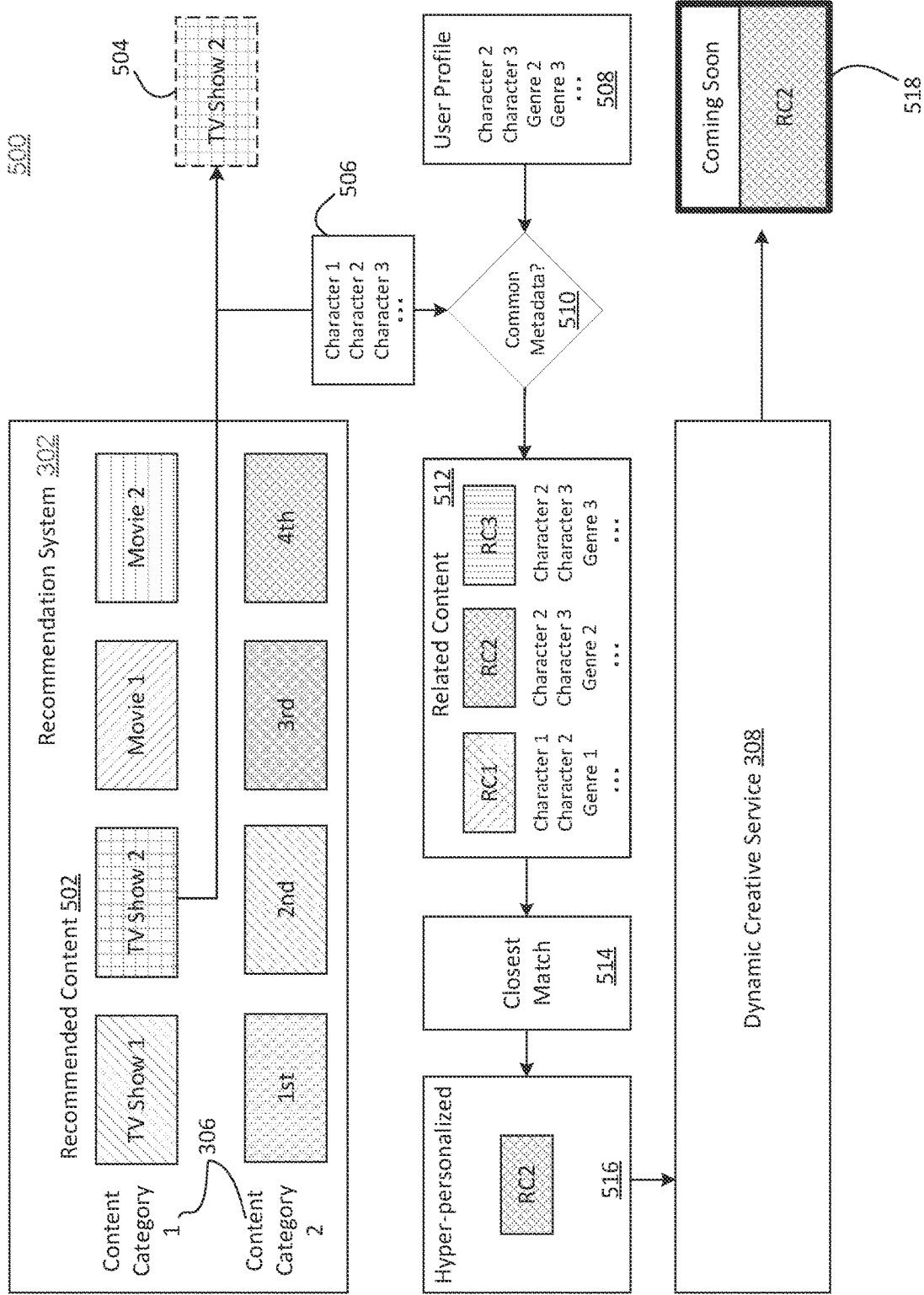
FIG. 5 illustrates another example diagram of a hyper-personalized banner system, according to some embodiments.

FIG. 5 illustrates another example diagram of a hyper-personalized banner system 500, according to some embodiments. Operations described may be implemented by processing logic that can comprise hardware (e.g., circuitry, dedicated logic, programmable logic, microcode, etc.), software (e.g., instructions executing on a processing device), or a combination thereof. It is to be appreciated that not all operations may be needed to perform the disclosure provided herein. Further, some of the operations may be performed simultaneously, or in a different order than described for FIG. 5, as will be understood by a person of ordinary skill in the art.

Hyper-personalized banner system 500 may be implemented with recommendation system 302. Recommendation system 302 may be configured with content recommendation server 128 to recommend one or more content assets 502 from one or more categories 306. Alternatively, or in addition to, one or more components of the recommendation system 302 may be implemented within the media system 104, by third party platforms, a cloud-based system or distributed across multiple computer-based systems. As shown, hyper-personalized banner system 500 may be implemented with a dynamic creative service 308.

In some embodiments, dynamic creative service 308 may be configured with ad server 130. Alternatively, or in addition to, one or more components of the dynamic creative service 308 may be implemented within the media system 104, by third party platforms, a cloud-based system or distributed across multiple computer-based systems. Dynamic creative service 308 may be configured with a plurality of possible advertising banner samples (i.e., templates) or may be configured as a dynamic banner generator (customized content, sizing, colors, graphics, arrangement, etc.). For example, the dynamic banner generator may position artwork elements differently from a standard template arrangement.

In a hyper-personalized embodiment, additional customer specific related content 512 is selected beyond the originally recommended content 504 assets, as shown, "TV Show 2". This hyper-personalized content may be arranged in an advertising banner based on one or more user preferences found in the user's profile 508. In a non-limiting example, to grow an audience, the creative team may generate a banner ad template with the hook "coming soon" or similar phrasing that suggests the content will soon to be available.

In a hyper-personalized embodiment, for the same recommended content (504) and ad template (e.g., FIG. 3, template 316), the system may generate one of many different banner combinations. In one non-limiting example, the recommended content 504 may include identifying metadata 506, such as characters found in the content. For example, the recommended content 504 is "TV show 2", where the content may also include a listing of characters (e.g., in order of importance). Characters may be different from actors in that they represent a scripted participant in a storyline of a movie, TV show, etc. Often times, viewers may feel some connection or affinity to a specific character. In some cases, this character may be played by multiple actors as often happens in superhero movies. Metadata reflecting a character may therefore include one or more actors, other series, movies or compilations where this character may appear or similar characters. This character metadata may provide further access to related content assets directly or indirectly as they relate to the primary content asset as will be described in greater detail hereafter.

In this non-limiting example, the metadata may designate similar character interests of the target consumer with other known consumer interests. In addition, the character metadata may be accompanied by additional metadata, such as, but not limited to, genre, actors, types of characters (e.g., protagonist, hero, villain, etc.), story lines (e.g., redemption, tragedy, etc.), location of story line, point of view (e.g., first person, etc.), scene descriptions, when the content was made, ideology (social, political, religious, etc.), collaborations (e.g., actors, directors, media companies, etc.), or typical customer interactions (e.g., duration of watching, completion rates, etc.), to name a few.

Current system architecture will assume that there may be a plurality of primary assets for "TV Show 2", and a plurality of interrelated secondary assets, linked by common characters (i.e., direct link) or similar or accompanying metadata (i.e., indirect link) with the user's profile 508, that can be retrieved from the Recommendation System 302 backend. In this approach, a user's profile 508 will be compared for one or more metadata entries that are in common (shown as common metadata 510) with the characters to see if the customer (or group of customers) has an affinity towards one or more of the common characters to select a different asset, such as one within a group of one or more related content 512. User profile 508 metadata (e.g., favorite characters) may be provided directly by the user, for example, as preferences. Alternatively, or in addition to, the metadata may be collected by recommendation system 302 by observation of user behaviors (frequency of specific characters in content selected, character types commonly found in selected content, etc.). Content affinity may be characterized by an ordered list of characters, with a highly occurring or liked character at the top of the ordered list and the next highest occurring or best liked character following and so on. Alternatively, or in addition to, the characters may be arranged in ordered metadata groups, such as, but not limited to, characters from a specific show, actors that play the characters, popularity of specific characters, to name a few. Metadata is not limited to positive preferences, as negative response metadata may also be valuable to avoid content that the specific customer does not want to see (e.g., specific characters or actors who play these characters, etc.). Other arrangements of user preferences delineated by associated metadata would be understood by one skilled in the art and may be interchanged without departing from the scope of the technology described herein. In various embodiments, content asset metadata may be matched to user profile metadata before or after delivery of one or more recommended content assets and one or more related content assets without departing from the scope of the technology described herein.

The additional, but distinctly separate embodiments can create virtually thousands, if not millions of banner artwork combinations, providing a level of personalization never before seen on any platform, let alone OTT platforms. This hyper-personalization improves the computer-based process of banner selection and solves one or more known problems with connecting with target customers at a level of personalization not reached by current systems.

As shown, recommendation system 302 would generate a content category 1 (306) of TV shows and movies that will be appearing soon on, for example, soon to be available on a streaming platform and order them (shown as 4 tiles) based, for example, on ratings or similar user preferences. The hyper-personalized banner system 500 would identify related content 512 that would complement or improve these campaigns. "TV Show 2" 504 has associated with it one or more metadata data fields, for example, characters (506) that are compared to the user's profile 508 for common metadata 510. Common characters would be a strong indicator of a user's affinity to this metadata instance (e.g., a specific character). Alternatively, or in addition to, the comparison could be made for similar characters. This approach may be effective when no common characters are detected. For example, if a specific customer likes Character A, played by Actor A, the system could search for additional characters that commonly appear with Actor A and substitute the corresponding metadata as common metadata.

Related content 512 may be pushed (e.g., as metadata links) with the original recommended content assets or be requested as a second call to the recommendation system. Alternatively, or in addition to, the call for related content may be made to a content source (e.g., content creator or provider), such as to content server 120 (FIG. 1). As shown in the example, related content "RC1-RC3", may each include one or more metadata (e.g., characters and genre), in addition to any common metadata (characters). A matching function may be used to select from a plurality of possible related content assets. For example, as shown, "RC2" matches two characters 2 and 3 found in the user profile 508 as preferences. A closest match selector 514 may determine a closest match using simple ordering, where a user's first metadata choice is selected when available in a related content asset. When multiple metadata matches are available, the system may select a related content asset by a second, third, or other number of common metadata (e.g., frequency of common metadata). Alternatively, or in addition to, a closest match selector 514 algorithm may be a weighted formulation where some metadata are better indicators of a user's likes/dislikes and therefore may be more heavily weighted. For example, metadata reflecting characters may be weighted more heavily. As shown, hyper-personalized related content 516 "RC2" has been selected based on a match to the user's profile of characters 2 and 3. Other known similarity algorithms, such as, but not limited to, ML, fuzzy logic, neural networks, etc., may be substituted without departing from the scope of the technology disclosed herein.

Dynamic creative service 308 may use any template or dynamic banner generation technique to insert (e.g., stitch) the hyper-personalized content asset 516 into an advertising banner. As shown, a creative advertising banner or dynamic banner is selected to introduce an upcoming TV show to soon be available on a streaming service or platform. Hyper-personalized content 516 "RC2", related to original recommended content asset 504, is sized and stitched into the ad banner template to form a composite ad banner 518.

Figure 6:
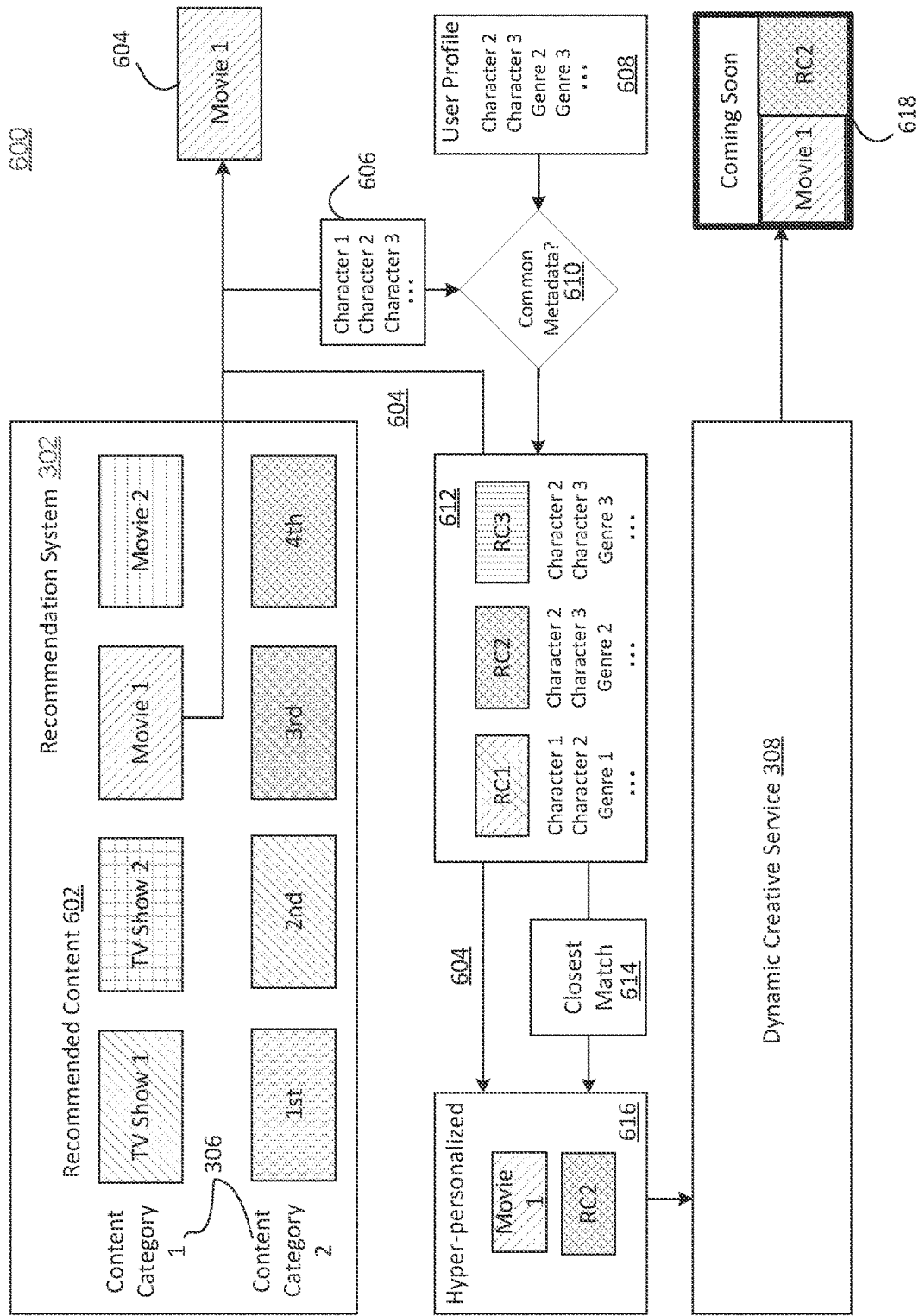
FIG. 6 illustrates another example diagram of a hyper-personalized banner system, according to some embodiments.

FIG. 6 illustrates another example diagram of a hyper-personalized banner system 600, according to some embodiments. Operations described may be implemented by processing logic that can comprise hardware (e.g., circuitry, dedicated logic, programmable logic, microcode, etc.), software (e.g., instructions executing on a processing device), or a combination thereof. It is to be appreciated that not all operations may be needed to perform the disclosure provided herein. Further, some of the operations may be performed simultaneously, or in a different order than described for FIG. 6, as will be understood by a person of ordinary skill in the art.

Hyper-personalized banner system 600 may be implemented with recommendation system 302. Recommendation system 302 may be configured with content recommendation server 128 to recommend one or more content assets 602 from one or more categories 306. Alternatively, or in addition to, one or more components of the recommendation system 302 may be implemented within the media system 104, by third party platforms, a cloud-based system or distributed across multiple computer-based systems. As shown, hyper-personalized banner system 600 may be implemented with a dynamic creative service 308.

In some embodiments, dynamic creative service 308 may be configured with ad server 130. Alternatively, or in addition to, one or more components of the dynamic creative service 308 may be implemented within the media system 104, by third party platforms, a cloud-based system or distributed across multiple computer-based systems. Dynamic creative service 308 may be configured with a plurality of possible advertising banner samples (i.e., templates) or may be configured as a dynamic banner generator (customized content, sizing, colors, graphics, arrangement, etc.). For example, the dynamic banner generator may position artwork elements differently from a standard template arrangement.

In a hyper-personalized embodiment, additional customer specific related content 612 is selected to accompany the originally recommended content assets 604 (e.g., "Movie 1"). This hyper-personalized content may be arranged as multiple content assets in an advertising banner based on one or more user preferences found in the user's profile 608. In a non-limiting example, to grow an audience, the creative team may generate a banner ad template with the hook "coming soon" or similar phrasing that suggests the content will soon to be available.

In a hyper-personalized embodiment, for the same recommended content (604) and ad template (e.g., FIG. 3, template 316), the system may generate one of many different banner combinations. In one non-limiting example, the recommended content 604 may include identifying metadata data fields 606, such as characters found in the "Movie 1". For example, the recommended content 604 is "Movie 1", where the recommended content metadata may include a listing of characters (e.g., in order of importance). Characters may be different from actors in that they represent a scripted participant in a movie or ongoing TV series. In some cases, this character may be played by multiple actors as often happens in superhero movies. Metadata reflecting a character may therefore include one or more actors, other series, other movies or compilations. This character metadata may provide further access to related content assets directly or indirectly as they relate to the primary content asset as will be described in greater detail hereafter.

In this non-limiting example, the metadata may designate similar character interests of the target consumer with other known consumer interests. In addition, the character metadata may be accompanied by additional metadata, such as, but not limited to, genre, actors, types of characters (e.g., protagonist, hero, villain, etc.), story lines (e.g., redemption, tragedy, etc.), location of story line, point of view (e.g., first person, etc.), scene descriptions, when the content was made, ideology (social, political, religious, etc.), collaborations (e.g., actors, directors, media companies, etc.), or typical customer interactions (e.g., duration of watching, completion rates, etc.).

Current system architecture will assume that there may be a plurality of primary assets for "Movie 1", and a plurality of interrelated secondary assets, linked by common characters (i.e., direct link) or similar or accompanying metadata (i.e., indirect link) with the user's profile 608, that can be retrieved (e.g., by metadata links) from the Recommendation System 302 backend. In this approach, a user's profile 608 will be compared for one or more metadata entries that are in common (shown as common metadata 610) with the user profile 608 characters to see if a target consumer (or group of consumers) has an affinity towards one or more of the common characters to select a different asset, such as related content 612. User profile 608 metadata may be provided directly by the user, for example, as preferences. Alternatively, or in addition to, the metadata may be collected by recommendation system 302 by observation of user behaviors (frequency of specific characters in content selected, character types commonly found in selected content, etc.). Content affinity may be characterized by an ordered list of characters, with a highly occurring or liked character at the top of the ordered list and the next highest occurring or best liked character following and so on. Alternatively, or in addition to, the characters may be arranged in ordered metadata groups, such as, but not limited to, characters from a specific show, actors that play the characters, popularity of specific characters, to name a few. Metadata is not limited to positive preferences, as negative response metadata may also be valuable to avoid content that the specific customer does not want to see (e.g., specific characters or actors, etc.). Other arrangements of user preferences delineated by associated metadata would be understood by one skilled in the art and may be interchanged without departing from the scope of the technology described herein. In various embodiments, content asset metadata may be matched to user profile metadata before or after delivery of one or more recommended content assets and one or more related content assets without departing from the scope of the technology described herein.

The additional, but distinctly separate embodiments can create virtually thousands, if not millions of banner artwork combinations, providing a level of personalization never before seen on any platform, let alone OTT platforms. This hyper-personalization improves the computer-based process of banner selection and solves one or more known problems with connecting with target customers at a level of personalization not reached by current systems.

As shown, recommendation system 302 would generate a content category 1 (306) of TV shows and movies that will be appearing soon on, for example, soon to be available on a streaming platform and order them (shown as 4 tiles) based, for example, on ratings or similar user preferences. The hyper-personalized banner system 600 would identify related content 612 that would complement or improve these campaigns. "Movie 1" 604 has associated with it one or more metadata data fields 606, for example, characters, which are compared for common metadata 610. Common characters would be a strong indicator of a user's affinity to this metadata instance (e.g., a specific character). Alternatively, or in addition to, the comparison could be made for similar characters. This approach may be effective when no common characters are detected. For example, if a specific customer likes Character A, played by Actor A, the system could search for additional characters that commonly appear with Actor A and substitute the corresponding metadata as common metadata.

Related content 612 may be pushed with the original recommended content assets or be requested as a second call to the recommendation system. Alternatively, or in addition to, the call for related content may be made to a content source (e.g., content creator or provider), such as to content server 120 (FIG. 1). As shown in the example, related content "RC1-RC3", each include one or more metadata (characters and genre), in addition to any common metadata (characters). A matching function may be used to select from a plurality of possible related content assets. For example, as shown, "RC2" matches two characters 2 and 3 found in the user profile 608 as preferences. A closest match selector 614 may determine a closest match using simple ordering, where a user's first metadata choice is selected when available in a related content asset. When multiple metadata matches are available, the system may select a related content asset by a second, third, or other number of common metadata (e.g., frequency of common metadata). Alternatively, or in addition to, a closest match selector 614 algorithm may be a weighted formulation where some metadata are better indicators of a user's likes/dislikes and therefore may be more heavily weighted. For example, metadata reflecting characters may be weighted more heavily. Other known similarity algorithms, such as, but not limited to, ML, fuzzy logic, neural networks, etc., may be substituted without departing from the scope of the technology disclosed herein.

In this embodiment, the original recommended content 604 is aggregated with the related content 612 for use as hyper-personalized content available to the dynamic creative service 308. As shown, hyper-personalized related content 612 RC2 has been selected based on a match to the user's profile of characters 2 and 3 and is aggregated with the originally recommended content 604 and made available to the dynamic creative service 308.

Dynamic creative service 308 may use any template or dynamic banner generation technique to insert (e.g., stitch) the hyper-personalized content asset 616 (i.e., multiple content assets) into an advertising banner. As shown, a creative advertising banner or dynamic banner is selected to introduce an upcoming movie to soon be available on a streaming service or platform. Hyper-personalized content 616 (i.e., multiple content assets) is sized and stitched into the ad banner template to form a composite ad banner 618.

Figure 7:
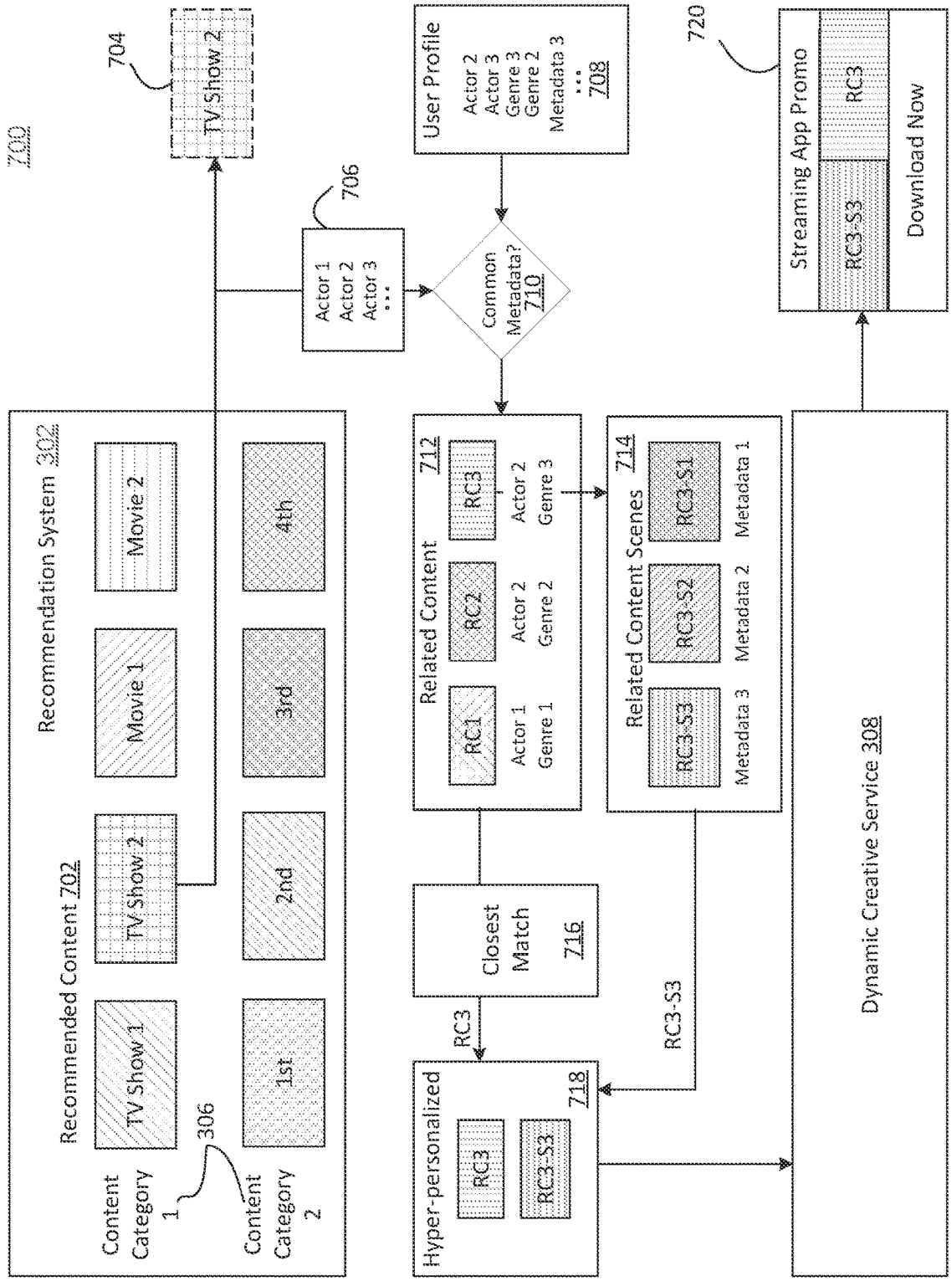
FIG. 7 illustrates another example diagram of a hyper-personalized banner system, according to some embodiments.

FIG. 7 illustrates another example diagram of a hyper-personalized banner system 700, according to some embodiments. Operations described may be implemented by processing logic that can comprise hardware (e.g., circuitry, dedicated logic, programmable logic, microcode, etc.), software (e.g., instructions executing on a processing device), or a combination thereof. It is to be appreciated that not all operations may be needed to perform the disclosure provided herein. Further, some of the operations may be performed simultaneously, or in a different order than described for FIG. 7, as will be understood by a person of ordinary skill in the art.

Hyper-personalized banner system 700 may be implemented with recommendation system 302. Recommendation system 302 may be configured with content recommendation server 128 to recommend one or more content assets 702 from one or more categories 306. Alternatively, or in addition to, one or more components of the recommendation system 302 may be implemented within the media system 104, by third party platforms, a cloud-based system or distributed across multiple computer-based systems. As shown, hyper-personalized banner system 700 may be implemented with a dynamic creative service 308.

In some embodiments, dynamic creative service 308 may be configured with ad server 130. Alternatively, or in addition to, one or more components of the dynamic creative service 308 may be implemented within the media system 104, by third party platforms, a cloud-based system or distributed across multiple computer-based systems. Dynamic creative service 308 may be configured with a plurality of possible advertising banner samples (i.e., templates) or may be configured as a dynamic banner generator (customized content, sizing, colors, graphics, arrangement, etc.). For example, the dynamic banner generator may position artwork elements differently from a standard template arrangement.

In a hyper-personalized embodiment, multiple levels of additional customer specific related content is selected beyond the originally recommended content assets 704, as shown, "TV Show 2". This hyper-personalized content may be arranged in an advertising banner based on one or more user preferences found in the user's profile 708. In a non-limiting example, to grow an audience, the creative team may generate a banner ad template with the hook "Streaming App Promo, Download now" or similar phrasing that suggests available promotional streaming apps.

In a hyper-personalized embodiment, for the same recommended content 704 and ad template, the system may generate one of many different banner combinations. In one non-limiting example, the recommended content 704 may include identifying metadata 706, such as actors found in the recommended content 704. For example, the recommended content 704 is "TV show 2", where the content may also include a listing of actors (e.g., in order of importance). Metadata reflecting an actor may also include one or more other actors, other series, movies or compilations with these actors. This actor metadata may provide further access to multiple levels of related content assets directly or indirectly as they relate to the primary content asset as will be described in greater detail hereafter.

In this non-limiting example, the metadata may designate similar actor interests of the target consumer with other known consumer interests. In addition, the actor metadata may be accompanied by additional metadata, such as, but not limited to, genre, characters, types of characters (e.g., protagonist, hero, villain, etc.), story lines (e.g., redemption, tragedy, etc.), location of story line, point of view (e.g., first person, etc.), scene descriptions, when the content was made, ideology (social, political, religious, etc.), collaborations (e.g., actors, directors, media companies, etc.), or typical customer interactions (e.g., duration of watching, completion rates, etc.).

Current system architecture will assume that there may be a plurality of primary assets for "TV Show 2", and a plurality of levels of interrelated secondary assets, linked by a direct link (e.g., common actors) or similar or accompanying metadata (i.e., indirect link) found within the user's profile 708, that can be retrieved from the Recommendation System 302 backend. In this approach, a user's profile 708 will be iteratively compared for one or more metadata entries that are in common (shown as common metadata 710) with the actors to see if the customer or group of similar customers have an affinity towards one or more of the common actors to select a different asset, such as related content 712. In addition, any number of additional levels of direct or indirect links, such as related content scenes, may be retrieved using the metadata of the related content 712 or additional metadata of any level of related content. In various embodiments, content asset metadata may be matched to user profile metadata before or after delivery of one or more recommended content assets and one or more related content assets without departing from the scope of the technology described herein.

User profile 708 metadata may be provided directly by the user, for example, as preferences. Alternatively, or in addition to, the metadata may be collected by recommendation system 302 by observation of user behaviors (frequency of specific actors in content selected, actor types commonly found in selected content, etc.). Content affinity may be characterized by an ordered list of actors, with a highly occurring or liked actor (i.e., popular) at the top of the ordered list and the next highest occurring or best liked actor following and so on. Alternatively, or in addition to, the actors may be arranged in ordered metadata groups, such as, but not limited to, actors from a specific show, characters that are played by the actors, popularity of specific actors, to name a few. Metadata is not limited to positive preferences, as negative response metadata may also be valuable to avoid content that the specific customer does not want to see (e.g., specific actors, etc.). Other arrangements of user preferences delineated by associated metadata would be understood by one skilled in the art and may be interchanged without departing from the scope of the technology described herein.

The additional, but distinctly separate embodiments can create virtually thousands, if not millions of banner artwork combinations, providing a level of personalization never before seen on any platform, let alone OTT platforms. This hyper-personalization improves the computer-based process of banner selection and solves one or more known problems with connecting with target customers at a level of personalization not reached by current systems.

As shown, recommendation system 302 would generate a content category 1 (306) of TV shows and movies that will be appearing soon on, for example, soon to be available on a streaming platform and order them (shown as 4 tiles) based, for example, on ratings or similar user preferences. The hyper-personalized banner system 700 would then identify related advertising campaigns as well as identifying related content 712 and 714 that would complement or improve these campaigns. "TV Show 2" 704 has associated with it one or more metadata data fields, for example, actors 706, which are compared for common metadata 710 to the user's preferences from their user profile 708. Common actors would be a strong indicator of a user's affinity to this metadata instance (e.g., a specific actor). Alternatively, or in addition to, the comparison could be made for similar actors (by genre, actor type (e.g., action), etc.). This approach may be effective when no common actors are detected. For example, if a specific customer likes Actor A, the system could search for additional actors that commonly appear with Actor A and substitute the corresponding metadata as common metadata.

Related content 712 may be pushed with the original recommended content assets or be requested as a second call to the recommendation system. Alternatively, or in addition to, the call for related content may be made to a content source (e.g., content creator or provider), such as to content server 120 (FIG. 1). As shown in the example, related content "RC1-RC3", each include one or more metadata (actors and genre), in addition to any common metadata (actors). A matching function may be used to select from a plurality of possible related content assets. For example, as shown, "RC3" matches actor 2 found in the user profile 708 as preferences (e.g., top choice). A closest match selector 716 may be determined using simple ordering, where a user's first metadata choice is selected when available in a related content asset. When multiple metadata matches are available, the system may select a related content asset by a second, third, or other number of common metadata (e.g., frequency of common metadata). Alternatively, or in addition to, a closest match selector 716 algorithm may be a weighted formulation where some metadata are better indicators of a user's likes/dislikes and therefore may be more heavily weighted. For example, metadata reflecting characters may be weighted more heavily. As shown, hyper-personalized related content 718 "RC3" has been selected based on a first level match to the user's profile of Actor 2. Other known similarity algorithms, such as, but not limited to, ML, fuzzy logic, neural networks, etc., may be substituted without departing from the scope of the technology disclosed herein.

Once one or more related content assets are chosen, sub related content assets may be subsequently selected using a match of one or more metadata from the user's profile 708. As shown, metadata 3 is a match and therefore, related content scene 714 "RC3-S3" (i.e., related content 3, scene 3) is selected as a second level match. While described for two levels, the techniques disclosed may be equally applied to any number of levels or may be applied within any single level. For example, two or more related content selections "RC1-RC3" within level 1 (shown as 712) or two or more related content scenes "RC3-SI-RC3-S3" within level 2 (shown as 714) may be selected without departing from the scope herein.

Dynamic creative service 308 may use any template or dynamic banner generation technique to insert (e.g., stitch) the hyper-personalized content asset 718 (multiple assets) into an advertising banner. As shown, a creative advertising banner or dynamic banner is selected to introduce an upcoming movie to soon be available on a streaming service or platform. Hyper-personalized content 718 may include "RC3", selected from the grouping of related content 712 and sub-related content "RC3-S3", selected from the grouping of related content scenes 714, and sized and stitched into the ad banner template to form a composite ad banner 720. While level 2 has been illustrated with "Related Content Scenes" 714, any known or future grouping of content grouped by metadata may be substituted without departing from the scope herein.

Figure 8:
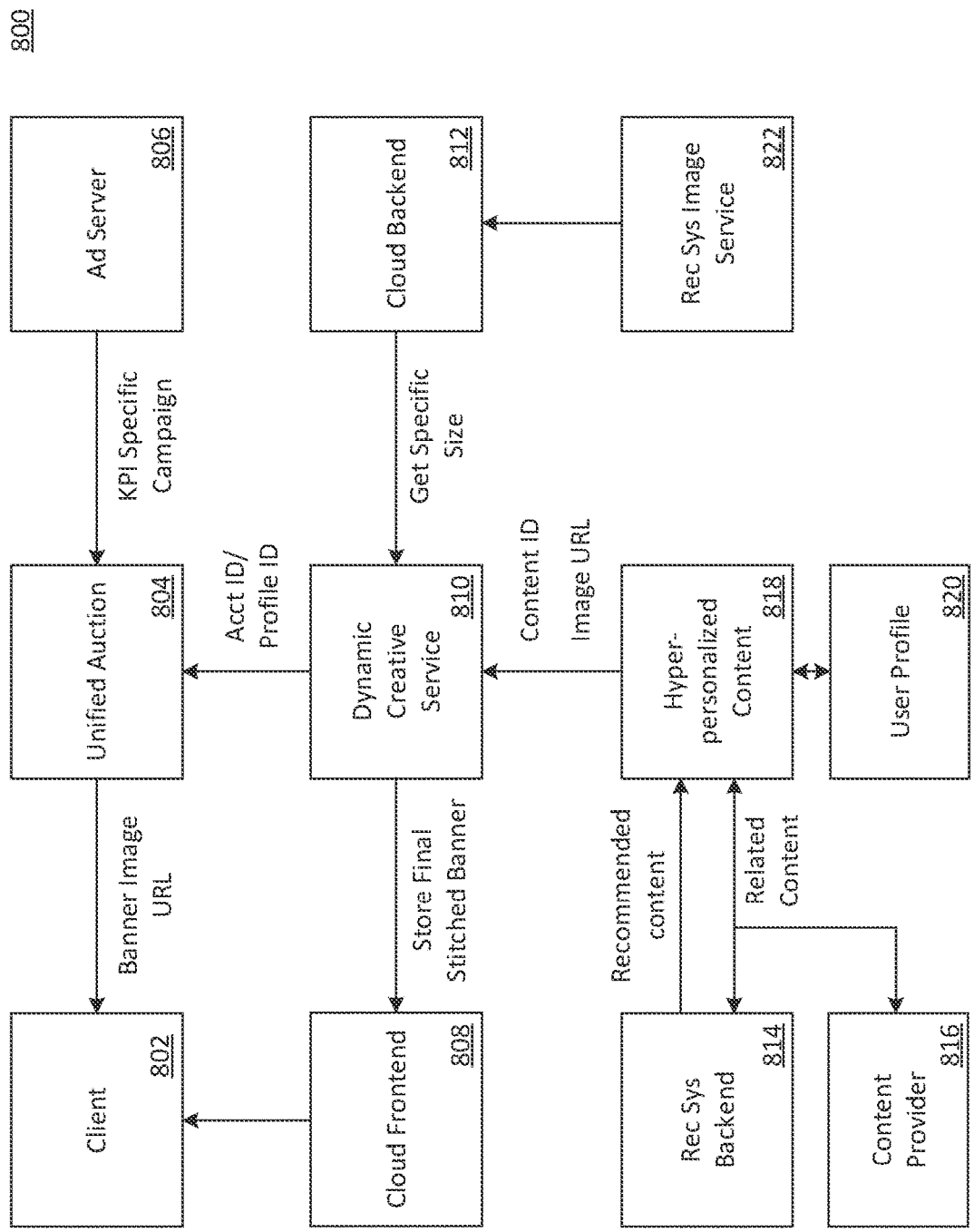
FIG. 8 illustrates a block diagram of a hyper-personalized banner system, according to some embodiments.

FIG. 8 illustrates a block diagram of a hyper-personalized banner system 800, according to some embodiments. System components described may be implemented by processing logic that can comprise hardware (e.g., circuitry, dedicated logic, programmable logic, microcode, etc.), software (e.g., instructions executing on a processing device), or a combination thereof. It is to be appreciated that not all components may be needed to perform the disclosure provided herein. Further, some of the processes performed on the components may be performed simultaneously, or in a different order than described for FIG. 8, as will be understood by a person of ordinary skill in the art.

Ad server 806 may be configured as a service that places advertisements on digital platforms. For example, ad serving technology companies provide advertisers a platform to serve ads, count them, choose the ads that will make the most money, and monitor the progress of different advertising campaigns. An ad server may be implemented as a Web server (e.g., ad server 130) that stores advertising content used in online marketing and delivers that content onto various digital platforms such as television, streaming devices, smartphones, tablets, laptops, etc. An ad server may be configured to store the advertising material and distribute that material into appropriate advertising slots. One purpose of an ad server is to deliver ads to users, to manage the advertising space, and, in the case of third-party ad servers, to provide an independent counting and tracking system for advertisers/marketers. Ad servers may also act as a system in which advertisers can count clicks/impressions in order to generate reports, which helps to determine the return on investment for an advertisement on a particular media streaming platform.

Unified auction 804 brings together a plurality of possible ad campaigns meeting various KPIs for selection. In one non-limiting example, pay-per-click (PPC) is an internet advertising model used to drive traffic to content streaming platforms, in which an advertiser pays a publisher when the ad is clicked (i.e., selected). Advertisers typically bid, in a unified auction 804, on content or keywords relevant to their target market and pay when ads are clicked. Alternatively, or in addition to, content sites may charge a fixed price per click rather than use a bidding system. PPC display advertisements, also known as banner ads, are shown on streaming platforms with related content that have agreed to show ads and are typically not pay-per-click advertising, but instead usually charge on a cost per thousand impressions (CPM). The amount advertisers pay depends on the publisher may be driven by two major factors: quality of the ad, and the maximum bid the advertiser is willing to pay per click measured against its competitors' bids. In general, the higher the quality of the ad, the lower the cost per click is charged and vice versa.

As previously described, recommendation system (RecSys) backend 814 (same as 302) may be configured with content recommendation server 128. Alternatively, or in addition to, one or more components of the recommendation system backend 814 may be implemented within the media system 104, by third party platforms, a cloud-based system or distributed across multiple computer-based systems. Recommendation system backend 814 may be configured to predict the "rating" or "preference" a user would give to an item. The embodiments described herein may use any content recommendation system, algorithm or models without departing from the scope of the technology described herein. A few commonly used systems will be described hereafter, but other approaches, including future approaches may be interchanged herein without departing from the scope of the technology described.

Dynamic Creative Service 810 is configured to visually combine one or more content recommendation representations (e.g., image, video, text, etc.) into a selected ad banner. An image stitcher may resize, change one or more colors, or add or remove one or more segments to the content representation while integrating it into a banner template (See FIGS. 3-7). The completed banner may be stored locally or in the cloud front end system 808 for delivery to the client 802. In some embodiments, the stitcher functionality may be performed on the client. For example, the client can, in real-time, generate the banner that the user would see on their screens.

Client 802, for example, media system 104, may pull from the unified auction 804 or call the completed stitched banner template from cloud front end system 808 to be displayed on the client device (e.g., display device 108). For example, the banner may be displayed on a same graphics window that renders a plurality of streaming channels. The streaming channels may, in one approach, be arranged as a series of content tiles and ordered or not ordered. For example, a series of streaming channels may be organized by genre and display a series of tiles in a descending order of popularity. The stitched banner may be prominently displayed to attract the attention of the user to a specific available content selection on one or more of the channels. Images may be retrieved by cloud backend 812 from an image service, such as RecSys Image Service 822.

As previously described, RecSys backend 814, in various embodiments, may provide recommended content with associated metadata to be included with or as a source of additional related content for hyper-personalized content 818. The hyper-personalized content may be determined based on matching or a similarity of metadata within user profile metadata 820. Additional related content may be provided by the RecSys backend 814 or alternatively by Content Provider 816.

Figure 9:
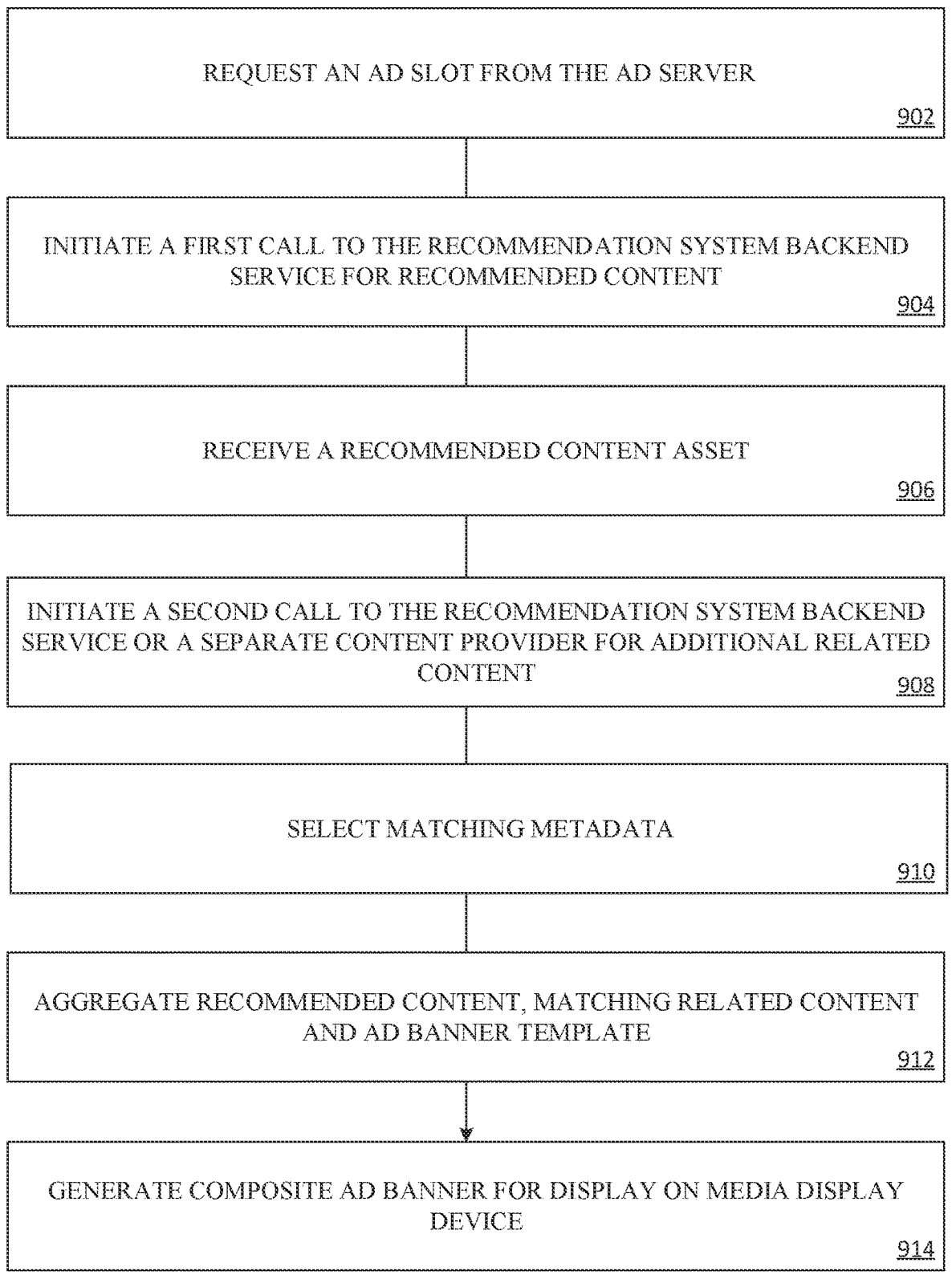
FIG. 9 illustrates a flow diagram for a hyper-personalized banner system, according to some embodiments.

FIG. 9 is a flow chart depicting a hyper-personalized banner system method that can be carried out in line with the discussion above. One or more of the operations in the method depicted by FIG. 9 could be carried out by one or more entities, including, without limitation, system server 126, media system 104 or content server 120, and/or one or more entities operating on behalf of or in cooperation with these or other entities. Any such entity could embody a computing system, such as a programmed processing unit or the like, configured to carry out one or more of the method operations. Further, a non-transitory data storage (e.g., disc storage, flash storage, or other computer readable medium) could have stored thereon instructions executable by a processing unit to carry out the various depicted operations. In some embodiments, the systems described generate and render dynamic banners on streaming platforms.

In 902, a streaming media device platform device implements an ad request for an ad slot for a user (based on their user profile) which is sent to an ad server along with user profile information and subsequently receives, from an ad system, a target banner template. In some embodiments, the target banner template is selected based on any of, opening an application (App), executing a first-time view, subscribing to a service, resumption of watching targeted content, completion of watching targeted content, or completion of watching a sponsorship program.

In 904, based on the user's profile, the streaming media device platform implements a first call to a recommendation system backend service for recommended content. As previously described, the user's profile information may include content preference information in the form of metadata. The metadata may reflect direct or indirect preferences. Recommended content will be selected to be inserted into the target banner template or additionally or alternatively be used to source additional related content based on the metadata.

In 906, the streaming media device platform receives the recommended content asset. The recommended content asset includes at least a link to the content asset and metadata.

In 908, based on the metadata of the recommended content asset, the streaming media device platform implements a second call to the recommendation system backend service for one or more additional related content assets. The streaming media device platform subsequently receives one or more additional related content assets. Alternatively, or in addition to, the second call is directed to a content provider or content creator.

In 910, the computing system selects closest matching metadata between metadata of the one or more additional related content assets and metadata from the user's profile. A closest match may be determined using simple ordering, where a user's first metadata choice is selected when available in a related content asset. When multiple metadata matches are available, the system may select a related content asset by a second, third, or other number of common metadata (e.g., frequency of common metadata). Alternatively, or in addition to, a closest match selector algorithm may include a weighted formulation where some metadata are better indicators of a user's likes/dislikes and therefore may be more heavily weighted.

In 912, the streaming media device platform aggregates the recommended content asset, one or more of the closest matching related content assets and the target banner template. While described as a single step, the target banner template, the recommended content asset and the one or more additional matching related content assets may be received and stored in computing memory of the streaming media device platform independently at various points in the sequence without departing from the scope of the technology described herein. For example, the target banner template could be received and stored post the ad slot request, the recommended content asset received and stored post the first call and the one or more of the closest matching related content assets received and stored post closest matching. Alternatively, if the first call also includes a request for additional related content assets, the system could return and store both the recommended content asset as well as the one and more additional related content assets post the first call, thus rendering the second call optional.

In 914, a 'stitcher' service obtains one or more of: the recommended content asset, the one or more closest matching additional content assets and an target banner template that includes one or more of the following—background assets, color schemes, call-to-actions, animation (if any), content ratings, etc. The stitcher then 'assembles' the creative that is a fully composite banner that the streaming media device platform renders on a media display device (e.g., client device screen).

Alternatively, or in addition to, one or more components of the personalized banner system may be implemented within the media system 104, by third party platforms, a cloud-based system or distributed across multiple computer-based systems. As previously shown, personalized banner system 300 may be implemented with a dynamic creative service 308.

The solution described above marries several key technical components that are lacking in the current personalization aspect of ad-served media. It takes in one or more levels of content based matching metadata to metadata located in a user's profile to generate hyper-personalized ad banners. By doing this, the advertising may be perceived as wholly organic and native by creating a natural extension of the user experience/user interface to include ad placements for the user. The various embodiments solve the technical problem of making advertising endemic for OTT data streaming platforms.

Example Computer System

Figure 10:
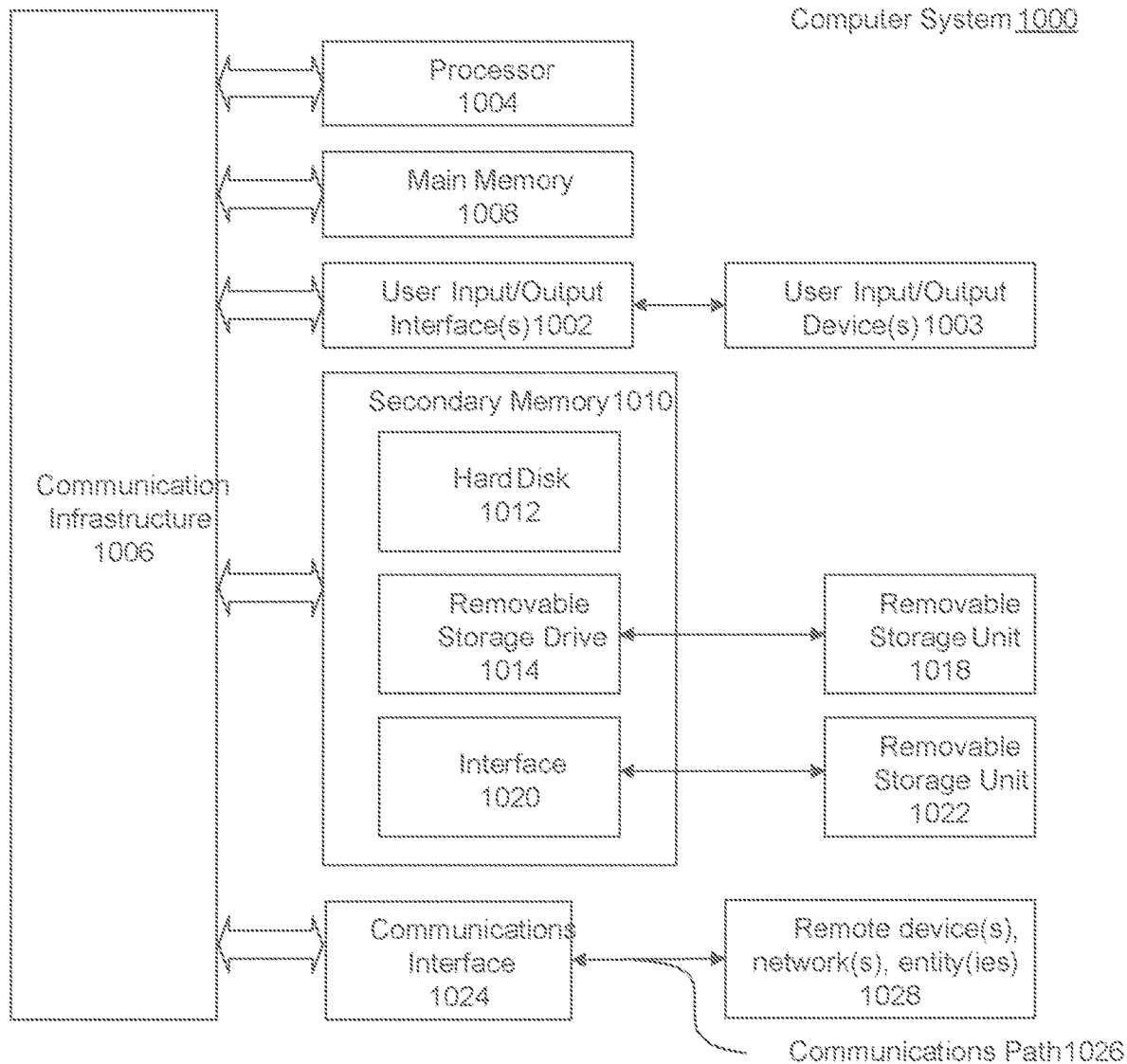
FIG. 10 illustrates an example computer system useful for implementing various embodiments.

Various embodiments may be implemented, for example, using one or more well-known computer systems, such as computer system 1000 shown in FIG. 10. For example, the media device 106 may be implemented using combinations or sub-combinations of computer system 1000. Also or alternatively, one or more computer systems 1000 may be used, for example, to implement any of the embodiments discussed herein, as well as combinations and sub-combinations thereof.

Computer system 1000 may include one or more processors (also called central processing units, or CPUs), such as a processor 1004. Processor 1004 may be connected to a communication infrastructure or bus 1006.

Computer system 1000 may also include user input/output device(s) 1003, such as monitors, keyboards, pointing devices, etc., which may communicate with communication infrastructure 1006 through user input/output interface(s) 1002.

One or more of processors 1004 may be a graphics processing unit (GPU). In an embodiment, a GPU may be a processor that is a specialized electronic circuit designed to process mathematically intensive applications. The GPU may have a parallel structure that is efficient for parallel processing of large blocks of data, such as mathematically intensive data common to computer graphics applications, images, videos, etc.

Computer system 1000 may also include a main or primary memory 1008, such as random access memory (RAM). Main memory 1008 may include one or more levels of cache. Main memory 1008 may have stored therein control logic (i.e., computer software) and/or data.

Computer system 1000 may also include one or more secondary storage devices or memory 1010. Secondary memory 1010 may include, for example, a hard disk drive 1012 and/or a removable storage device or drive 1014. Removable storage drive 1014 may be a floppy disk drive, a magnetic tape drive, a compact disk drive, an optical storage device, tape backup device, and/or any other storage device/drive.

Removable storage drive 1014 may interact with a removable storage unit 1018. Removable storage unit 1018 may include a computer usable or readable storage device having stored thereon computer software (control logic) and/or data. Removable storage unit 1018 may be a floppy disk, magnetic tape, compact disk, DVD, optical storage disk, and/any other computer data storage device. Removable storage drive 1014 may read from and/or write to removable storage unit 1018.

Secondary memory 1010 may include other means, devices, components, instrumentalities or other approaches for allowing computer programs and/or other instructions and/or data to be accessed by computer system 1000. Such means, devices, components, instrumentalities or other approaches may include, for example, a removable storage unit 1022 and an interface 1020. Examples of the removable storage unit 1022 and the interface 1020 may include a program cartridge and cartridge interface (such as that found in video game devices), a removable memory chip (such as an EPROM or PROM) and associated socket, a memory stick and USB or other port, a memory card and associated memory card slot, and/or any other removable storage unit and associated interface.

Computer system 1000 may further include a communication or network interface 1024. Communication interface 1024 may enable computer system 1000 to communicate and interact with any combination of external devices, external networks, external entities, etc. (individually and collectively referenced by reference number 1028). For example, communication interface 1024 may allow computer system 1000 to communicate with external or remote devices 1028 over communications path 1026, which may be wired and/or wireless (or a combination thereof), and which may include any combination of LANs, WANs, the Internet, etc. Control logic and/or data may be transmitted to and from computer system 1000 via communication path 1026.

Computer system 1000 may also be any of a personal digital assistant (PDA), desktop workstation, laptop or notebook computer, netbook, tablet, smart phone, smart watch or other wearable, appliance, part of the Internet-of-Things, and/or embedded system, to name a few non-limiting examples, or any combination thereof.

Computer system 1000 may be a client or server, accessing or hosting any applications and/or data through any delivery paradigm, including but not limited to remote or distributed cloud computing solutions; local or on-premises software ("on-premise" cloud-based solutions); "as a service" models (e.g., content as a service (CaaS), digital content as a service (DCaaS), software as a service (SaaS), managed software as a service (MSaaS), platform as a service (PaaS), desktop as a service (DaaS), framework as a service (FaaS), backend as a service (BaaS), mobile backend as a service (MBaaS), infrastructure as a service (IaaS), etc.); and/or a hybrid model including any combination of the foregoing examples or other services or delivery paradigms.

Any applicable data structures, file formats, and schemas in computer system 1000 may be derived from standards including but not limited to JavaScript Object Notation (JSON), Extensible Markup Language (XML), Yet Another Markup Language (YAML), Extensible Hypertext Markup Language (XHTML), Wireless Markup Language (WML), MessagePack, XML User Interface Language (XUL), or any other functionally similar representations alone or in combination. Alternatively, proprietary data structures, formats or schemas may be used, either exclusively or in combination with known or open standards.

In some embodiments, a tangible, non-transitory apparatus or article of manufacture comprising a tangible, non-transitory computer useable or readable medium having control logic (software) stored thereon may also be referred to herein as a computer program product or program storage device. This includes, but is not limited to, computer system 1000, main memory 1008, secondary memory 1010, and removable storage units 1018 and 1022, as well as tangible articles of manufacture embodying any combination of the foregoing. Such control logic, when executed by one or more data processing devices (such as computer system 1000 or processor(s) 1004), may cause such data processing devices to operate as described herein.

Based on the teachings contained in this disclosure, it will be apparent to persons skilled in the relevant art(s) how to make and use embodiments of this disclosure using data processing devices, computer systems and/or computer architectures other than that shown in FIG. 10. In particular, embodiments can operate with software, hardware, and/or operating system implementations other than those described herein.

CONCLUSION

It is to be appreciated that the Detailed Description section, and not any other section, is intended to be used to interpret the claims. Other sections can set forth one or more but not all exemplary embodiments as contemplated by the inventor(s), and thus, are not intended to limit this disclosure or the appended claims in any way.

While this disclosure describes exemplary embodiments for exemplary fields and applications, it should be understood that the disclosure is not limited thereto. Other embodiments and modifications thereto are possible, and are within the scope and spirit of this disclosure. For example, and without limiting the generality of this paragraph, embodiments are not limited to the software, hardware, firmware, and/or entities illustrated in the figures and/or described herein. Further, embodiments (whether or not explicitly described herein) have significant utility to fields and applications beyond the examples described herein.

Embodiments have been described herein with the aid of functional building blocks illustrating the implementation of specified functions and relationships thereof. The boundaries of these functional building blocks have been arbitrarily defined herein for the convenience of the description. Alternate boundaries can be defined as long as the specified functions and relationships (or equivalents thereof) are appropriately performed. Also, alternative embodiments can perform functional blocks, steps, operations, methods, etc. using orderings different than those described herein.

References herein to "one embodiment," "an embodiment," "an example embodiment," or similar phrases, indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it would be within the knowledge of persons skilled in the relevant art(s) to incorporate such feature, structure, or characteristic into other embodiments whether or not explicitly mentioned or described herein. Additionally, some embodiments can be described using the expression "coupled" and "connected" along with their derivatives. These terms are not necessarily intended as synonyms for each other. For example, some embodiments can be described using the terms "connected" and/or "coupled" to indicate that two or more elements are in direct physical or electrical contact with each other. The term "coupled," however, can also mean that two or more elements are not in direct contact with each other, but yet still co-operate or interact with each other.

The breadth and scope of this disclosure should not be limited by any of the above-described exemplary embodiments, but should be defined only in accordance with the following claims and their equivalents.

What is claimed is:

1. A computer implemented method for creating dynamic banners, the method comprising:
    generating, based on a user profile and by a streaming media device platform, an ad request;
    receiving, from an ad system, a target banner template;
    generating, based on the user profile, a first call to a content recommendation system for recommended content assets for the target banner template;
    receiving, from the content recommendation system, a recommended content asset;
    generating, based on metadata of the received recommended content asset, a second call to a content provider system for one or more additional related content assets;
    receiving, from the content provider system, the one or more additional related content assets;
    matching similar metadata of the one or more additional related content assets to metadata of the user profile;
    selecting, based on the matching, one or more of the additional related content assets as matching content;
    stitching the target banner template, one or more of the recommended content assets and the matching content into the target banner template to form a composite banner; and
    rendering the composite banner on a media device display.

2. The method of claim 1, wherein the composite banner comprises an endemic banner.

3. The method of claim 1, wherein the streaming media device platform comprises an Over-the-Top (OTT) device.

4. The method of claim 1, wherein the content provider system comprises the content recommendation system.

5. The method of claim 1, wherein the selecting one or more of the additional related content assets as matching content further comprising selecting a closest match based on any of:
    ordering of the metadata in the user profile;
    highest frequency of common metadata;
    grouping of the metadata;
    avoiding a match with negative response metadata;
    a weighted metadata formulation, wherein metadata are provided selected variable weighting;
    Machine Learning (ML);
    fuzzy logic, or
    neural networks.

6. The method of claim 1, further comprising iteratively matching similar metadata of the one or more additional related content assets to the metadata of the user profile.

7. The method of claim 5, wherein the target banner template is selected based on any of:
    opening an application (App);
    executing a first-time view;
    subscribing to a service;
    resumption of watching targeted content;
    completion of watching targeted content; or
    completion of watching a sponsorship program.

8. A system, comprising:
    a memory; and
    at least one processor coupled to the memory and configured to perform operations comprising:
    generating, based on a user profile, an ad request;
    receiving, from an ad system, a target banner template;
    generating, based on the user profile, a first call to a content recommendation system for recommended content assets for the target banner template;
    receiving, from the content recommendation system, a recommended content asset;
    generating, based on metadata of the received recommended content asset, a second call to a content provider system for one or more additional related content assets;
    receiving, from the content recommendation system, the one or more additional related content assets;
    matching similar metadata of the one or more additional related content assets to metadata of the user profile;
    selecting, based on the matching, one or more of the additional related content assets as matching content;
    stitching the target banner template, one or more of the recommended content assets and the matching content into the target banner template to form a composite banner; and
    rendering the composite banner on a media device display.

9. The system of claim 8, where the composite banner comprises an endemic banner.

10. The system of claim 8, where the system comprises a streaming media device platform for an Over-the-Top (OTT) device.

11. The system of claim 8, wherein the content provider system comprises the content recommendation system.

12. The system of claim 8, wherein the selecting one or more of the additional related content assets as matching content further comprises selecting a closest match based on any of:
    ordering of the metadata in the user profile;
    highest frequency of common metadata;
    grouping of metadata in the user profile;

avoiding a match with negative response metadata;
a weighted metadata formulation, wherein the metadata are provided selected weighting;
Machine Learning (ML);
fuzzy logic, or
neural networks.

13. The system of claim 8, the operations further comprising iteratively matching similar metadata of the one or more additional related content assets to the metadata of the user profile.

14. The system of claim 8, wherein the target banner template is selected based on any of:
opening an application (App);
executing a first-time view;
subscribing to a service;
resumption of watching targeted content;
completion of watching targeted content; or
completion of watching a sponsorship program.

15. A non-transitory computer-readable medium having instructions stored thereon that, when executed by at least one computing device, cause the at least one computing device to perform operations comprising:
generating, based on a user profile, an ad request;
receiving, from an ad system, a target banner template;
generating, based on the user profile, a first call to a content recommendation system for recommended content assets for the target banner template;
receiving, from the content recommendation system, a recommended content asset;
generating, based on metadata of the received recommended content asset, a second call to a content provider system for one or more additional related content assets;
receiving, from the content recommendation system, the one or more additional related content assets;
matching similar metadata of the one or more additional related content assets to metadata of the user profile;
selecting, based on the matching, one or more of the additional related content assets as matching content;
stitching the target banner template, one or more of the recommended content assets and the matching content into the target banner template to form a composite banner; and
rendering the composite banner on a media device display.

16. The non-transitory computer-readable medium of claim 15, wherein the composite banner comprises an endemic banner and the computing device comprises an Over-the-Top (OTT) device.

17. The non-transitory computer-readable medium of claim 15, wherein the content provider system comprises the content recommendation system.

18. The non-transitory computer-readable medium of claim 15, wherein the selecting one or more of the additional related content assets as matching content further comprises selecting a closest match based on any of:
ordering of the metadata in the user profile;
highest frequency of common metadata;
grouping of metadata in the user profile;
avoiding a match with negative response metadata;
a weighted metadata formulation, wherein the metadata are provided selected weighting;
Machine Learning (ML);
fuzzy logic, or
neural networks.

19. The non-transitory computer-readable medium of claim 15, the operations further comprising: iteratively matching similar metadata of the one or more additional related content assets to the metadata of the user profile.

20. The non-transitory computer-readable medium of claim 15, wherein the target banner template is selected based on any of:
opening an application (App);
executing a first-time view;
subscribing to a service;
resumption of watching targeted content;
completion of watching targeted content; or
completion of watching a sponsorship program.

\* \* \* \* \*